United States Patent
Wilson et al.

(10) Patent No.: US 9,658,061 B2
(45) Date of Patent: May 23, 2017

(54) LINE SCANNER THAT USES A COLOR IMAGE SENSOR TO IMPROVE DYNAMIC RANGE

(71) Applicant: FARO Technologies, Inc., Lake Mary, FL (US)

(72) Inventors: Christopher Michael Wilson, Lake Mary, FL (US); Paul C. Atwell, Lake Mary, FL (US)

(73) Assignee: FARO TECHNOLOGIES, INC., Lake Mary, FL (US)

(*) Notice: Subject to any disclaimer, the term of this patent is extended or adjusted under 35 U.S.C. 154(b) by 268 days.

(21) Appl. No.: 14/580,468

(22) Filed: Dec. 23, 2014

(65) Prior Publication Data

US 2015/0185000 A1    Jul. 2, 2015

Related U.S. Application Data

(60) Provisional application No. 61/922,163, filed on Dec. 31, 2013.

(51) Int. Cl.
*G01B 11/24* (2006.01)
*G01B 11/25* (2006.01)

(52) U.S. Cl.
CPC .............. *G01B 11/24* (2013.01); *G01B 11/25* (2013.01)

(58) Field of Classification Search
CPC ................................ G01B 11/24; G01B 11/25
USPC .......................................................... 33/503
See application file for complete search history.

(56) References Cited

U.S. PATENT DOCUMENTS

| | | | |
|---|---|---|---|
| 3,971,065 | A | 7/1976 | Bayer |
| 4,846,577 | A | 7/1989 | Grindon |
| 5,280,542 | A | 1/1994 | Ozeki et al. |
| 5,402,582 | A | 4/1995 | Raab |
| 5,611,147 | A | 3/1997 | Raab |
| 5,690,640 | A | 11/1997 | Gotfried |
| 5,812,269 | A | 9/1998 | Svetkoff et al. |
| 5,828,793 | A | 10/1998 | Mann |
| 5,986,745 | A | 11/1999 | Hermary et al. |
| 6,028,672 | A * | 2/2000 | Geng .................. G01B 11/022 250/237 G |
| 6,628,335 | B1 | 9/2003 | Numazaki et al. |

(Continued)

FOREIGN PATENT DOCUMENTS

| | | | | |
|---|---|---|---|---|
| CN | 101667303 A | * | 3/2010 | ............. G01B 11/25 |
| DE | 102009055988 B3 | | 3/2011 | |

(Continued)

OTHER PUBLICATIONS

Written Opinion of the International Searching Authority as provided in the EPO Global Dossier of Espacenet for PCT/US2014/072315, dated Jun. 30, 2016, 6 pages.*

(Continued)

*Primary Examiner* — R. A. Smith
(74) *Attorney, Agent, or Firm* — Cantor Colburn LLP

(57) ABSTRACT

A method for measuring 3D coordinates of points on a surface of an object by providing an articulated arm connected to a laser line probe. The laser line probe having a color camera sends color images to a processor, which determines 3D surface coordinates using triangulation. The processor weights each of the colors received from the pixels to enable dark and bright regions of the surface to be measured simultaneously.

8 Claims, 18 Drawing Sheets

(56) References Cited

U.S. PATENT DOCUMENTS

| | | | |
|---|---|---|---|
| 6,721,007 B1 | 4/2004 | Tani et al. | |
| 6,753,876 B2 | 6/2004 | Brooksby et al. | |
| 6,822,681 B1 | 11/2004 | Aoki | |
| 6,822,687 B1 | 11/2004 | Kakiuchi et al. | |
| 6,876,392 B1 | 4/2005 | Uomori et al. | |
| 7,006,142 B2 | 2/2006 | Seo | |
| 7,084,989 B2 | 8/2006 | Johannesson et al. | |
| 7,202,957 B2 | 4/2007 | Ban et al. | |
| 7,203,573 B2 | 4/2007 | Ban et al. | |
| 7,212,665 B2 | 5/2007 | Yang et al | |
| 7,237,919 B2 | 7/2007 | Uomori et al. | |
| 7,386,367 B2 | 6/2008 | Watanabe et al. | |
| 7,489,410 B2 | 2/2009 | Nishio | |
| 7,492,398 B1 * | 2/2009 | Norita et al. | A61B 1/00 348/294 |
| 7,620,235 B2 | 11/2009 | Daniel | |
| 7,693,325 B2 * | 4/2010 | Pulla et al. | G01B 21/04 33/503 |
| 8,773,700 B2 | 7/2014 | Inoue et al. | |
| 9,008,369 B2 | 4/2015 | Schofield et al. | |
| 2003/0090646 A1 | 5/2003 | Riegl et al. | |
| 2003/0117412 A1 | 6/2003 | Brooksby et al. | |
| 2005/0278098 A1 | 12/2005 | Breed | |
| 2007/0064976 A1 | 3/2007 | England, III | |
| 2007/0296979 A1 | 12/2007 | Morimoto et al. | |
| 2008/0105731 A1 | 5/2008 | Kodama et al. | |
| 2009/0187373 A1 | 7/2009 | Atwell et al. | |
| 2010/0128109 A1 | 5/2010 | Banks | |
| 2010/0329554 A1 | 12/2010 | Zhai et al. | |
| 2011/0046917 A1 | 2/2011 | Lippuner et al. | |
| 2011/0143811 A1 | 6/2011 | Rodriguez | |
| 2011/0170534 A1 | 7/2011 | York | |
| 2011/0292406 A1 | 12/2011 | Hollenbeck | |
| 2012/0287265 A1 | 11/2012 | Schumann et al. | |
| 2013/0046506 A1 * | 2/2013 | Takabayashi | G06T 7/0018 702/155 |
| 2013/0107032 A1 | 5/2013 | Yamada | |
| 2013/0176453 A1 | 7/2013 | Mate et al. | |
| 2013/0286196 A1 | 10/2013 | Atwell | |
| 2013/0342674 A1 | 12/2013 | Dixon | |
| 2014/0002608 A1 | 1/2014 | Atwell et al. | |
| 2015/0085079 A1 | 3/2015 | Gittinger et al. | |
| 2015/0160343 A1 * | 6/2015 | Zweigle et al. | G09B 29/004 356/5.04 |
| 2015/0189201 A1 | 7/2015 | Bridges | |

FOREIGN PATENT DOCUMENTS

| | | | |
|---|---|---|---|
| DE | 102010045803 A1 | 3/2012 | |
| DE | 102011103510 A1 | 12/2012 | |
| DE | 102012105027 A1 | 1/2013 | |
| JP | 05026638 A * | 2/1993 | G01B 11/24 |
| JP | H05340727 A | 12/1993 | |
| JP | H06265320 A | 9/1994 | |
| JP | 2004037274 A | 2/2004 | |
| JP | 2009085775 A | 4/2009 | |
| JP | 2009168658 A | 7/2009 | |
| JP | 2010085472 A | 4/2010 | |
| JP | 2013064644 A | 4/2013 | |
| JP | 2013516928 A | 5/2013 | |
| JP | 2013113696 A | 6/2013 | |
| WO | 2010000230 A2 | 1/2010 | |
| WO | 2011053678 A1 | 5/2011 | |
| WO | 2011085283 A1 | 7/2011 | |
| WO | 2013101620 A1 | 7/2013 | |

OTHER PUBLICATIONS

Abolbashari, et al., "High dynamic range compressive imaging; a programmable imaging system", Optical Engineering, Jun. 11, 2012, Retrieved from the Internet: URL: http://dx.doi.org/10.1117/1.OE.51.7.071407; 9 pages.

Gu, Jinwei et al., "Coded Rolling Shutter Photography: Flexible Space-Time Sampling," Computational Photography (ICCP), 2010, IEEE International Conference on, IEEE, Piscataway, NJ, USA, Mar. 29, 2010, 8 pgs.

Notification of Transmittal of the International Search Report and the Written Opinion of the International Searching Authority, or the Declaration, PCT/US2014/072638; Mar. 18, 2015, 12 pages.

Notification of Transmittal of the International Search Report and the Written Opinion of the International Searching Authority, or the Declaration; PCT/US2014/046586; Mailed Oct. 16, 2014, 10 pages.

Notification of Transmittal of the International Search Report and the Written Opinion of the International Searching Authority, or the Declaration; PCT/US2014/050793, Dec. 9, 2014, 11 pages.

Notification of Transmittal of the International Search Report and the Written Opinion of the International Searching Authority, or the Declaration; PCT/US2014/072315, Mar. 6, 2015, 4 pages.

German Office Action for Application No. 10 2013 110 583.1 dated Nov. 27, 2015; pp. 2.

* cited by examiner

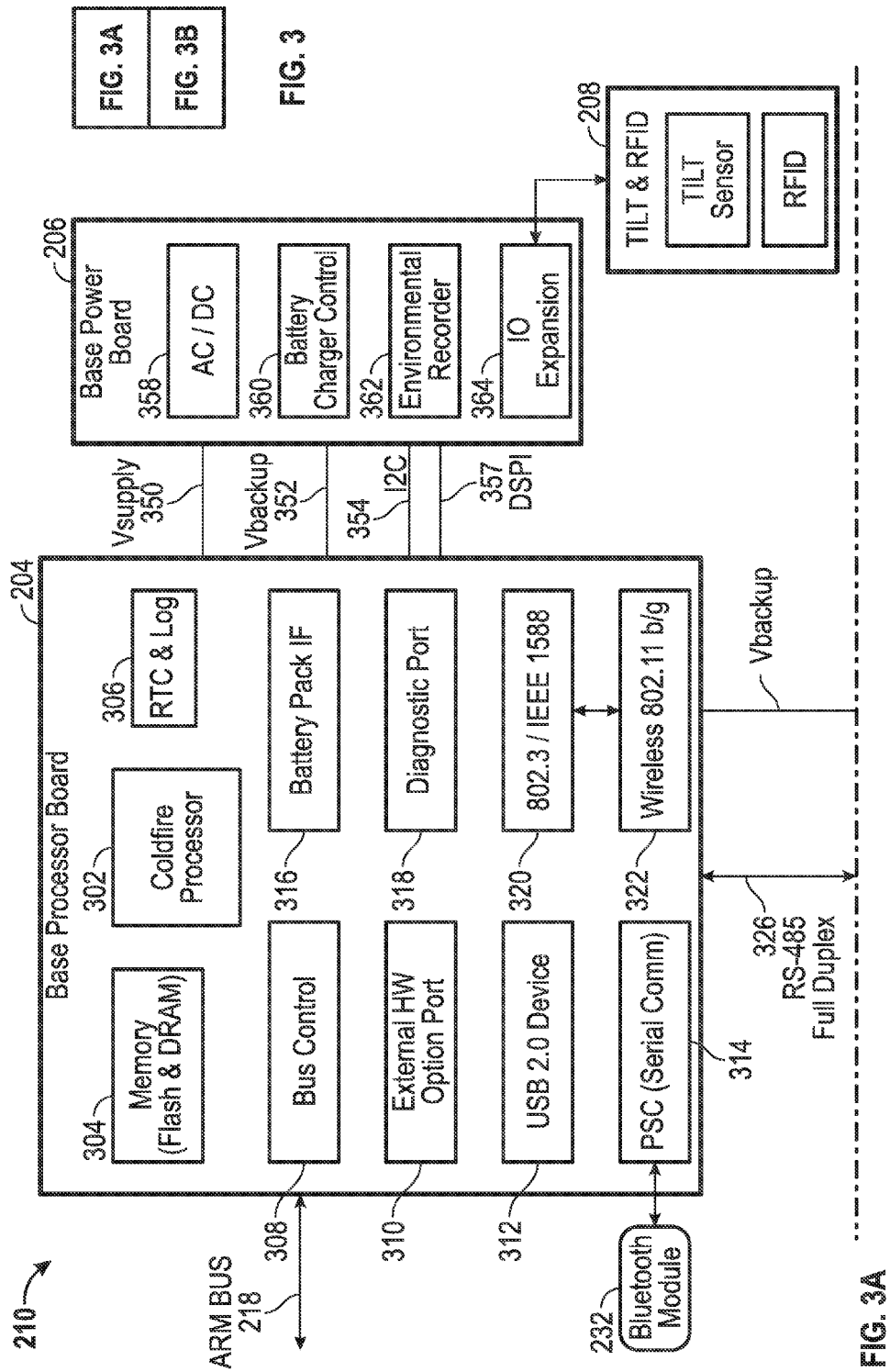

LINE SCANNER THAT USES A COLOR IMAGE SENSOR TO IMPROVE DYNAMIC RANGE

CROSS-REFERENCE TO RELATED APPLICATIONS

The present application claims the benefit of U.S. Provisional Patent Application No. 61/922,163, filed Dec. 31, 2013, the contents of which are incorporated by reference herein.

FIELD OF THE INVENTION

The present disclosure relates to a laser line probe, and more particularly to a laser line probe having an improved high dynamic range with respect to its image capture capability.

BACKGROUND OF THE INVENTION

The three-dimensional ("3D") physical characteristics of surfaces of objects may be measured using various non-contact techniques and devices. Such measurements may be carried out for various reasons, including part inspection, rapid prototyping, comparison of the actual part to a CAD model of the part, reverse engineering, 3D modeling, etc. Most often, these non-contact devices utilize triangulation-based techniques for processing the raw captured data representing the surface of an object into the resulting actual measurements of the object surface.

One type of triangulation-based, non-contact device is a laser line probe ("LLP"), which includes a projector and a camera. The projector includes a light source that emits a light, typically as a line. Thus, the LLP is also known as a line scanner. The projector also includes a lens that projects the emitted light onto an object in a relatively clear (unblurred) state. The emitted light may be laser light, partially coherent light, or incoherent light. The camera includes a camera-type imaging device, such as a charge-coupled device ("CCD") or CMOS photosensitive array. The camera also includes a camera lens that captures the pattern of light on the object surface and converts it into a relatively clear (unblurred) state on the photosensitive array. The camera is typically positioned adjacent the laser light source within the LLP device. The projector has a virtual emission point from which the line or stripe of light appears to "fan out" in an angle in one dimension and in a flat sheet in the orthogonal dimension. The camera has a camera perspective center through which rays of light from the pattern on the object appear to pass in traveling to the photosensitive array. The line segment between the virtual emission point and the camera perspective center is called the baseline, and the length of the baseline is called the baseline length.

In some cases, the LLP is shaped as a hand-held device. In other cases, it may be attached to a motorized device or fixed in position on a production line. The fan of light that strikes the surface of the object forms a relatively bright stripe of light on the object surface. The camera captures the 3D silhouette or profile of the laser stripe projected onto the object. For the case of a hand-held LLP, to cover all or some portion of an object with the line of light, the LLP is moved by the user such that the projected line stripe extends over all or at least the desired portion of the object within the LLP's field of view. That way, by moving the LLP over the object, hundreds of cross sections of the object surface are captured as 3D point clouds of raw data. Some modern LLPs can capture 60 frames, or stripes, of 3D data per second, or approximately 45,000 points of data per second. Signal processing electronics (e.g., a computer or a processor) are provided that run software which processes the 3D raw point cloud data into the resulting 3D image of the object that includes dimensional measurements as obtained by the LLP and its laser stripe and triangulation measurement process.

The image of the reflected line on the imaging device normally changes as the distance between the imaging device and the object surface changes. By knowing the baseline distance, the orientation of the projector and camera with respect to baseline, and the coordinates on the photosensitive array of the imaged pattern of light, known triangulation methods may be used to measure 3D coordinates of points on the surface of the object. That is, as the LLP is moved, the imaging device sees each projected line stripe. Any deviations on the photosensitive array from a straight line pattern may be translated into height variations on the object surface, thereby defining the object surface. In other words, the method described hereinabove digitizes the shape and position of the object within the field of view of the LLP. In this way the measured object may be checked against a CAD design model of the same object to determine any discrepancies therebetween.

Portable articulated arm coordinate measuring machines ("AACMMs") may include a tactile probe configured to be brought into contact with an object to determine 3D coordinates of the object surface. AACMMs have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a "hard" contact touch measurement probe (e.g., a ball) along the surface of the part or object to be measured. The measurement data are then recorded and provided to the user. In some cases, the data are provided to the user in visual form, for example, in 3D form on a computer screen. In other cases, the data are provided to the user in numeric form, for example when measuring the diameter of a hole, the text "Diameter=1.0034" is displayed on a computer screen.

An example of a prior art portable AACMM is disclosed in commonly assigned U.S. Pat. No. 5,402,582 ("the '582 patent"), which is incorporated herein by reference in its entirety. The '582 patent discloses a 3D measuring system comprised of a manually-operated AACMM having a support base on one end and a "hard" measurement probe at the other end. Commonly assigned U.S. Pat. No. 5,611,147 ("the '147 patent"), which is incorporated herein by reference in its entirety, discloses a similar AACMM. In the '147 patent, the AACMM has a number of features including an additional rotational axis at the probe end, thereby providing for an arm with either a two-two-two or a two-two-three axis configuration (the latter case being a seven axis arm).

It is generally known and accepted practice to attach a laser line probe to the probe end of an AACMM. The result is a fully integrated, portable, contact/non-contact measurement device. That is, the AACMM having an LLP attached thereto provides for both contact measurements of an object through use of the "hard" probe of the AACMM and for non-contact measurements of the object through use of the LLP's laser and imaging device. More specifically, the combination AACMM and LLP allows users to quickly inspect or reverse engineer complex and organic shapes via laser scanning, as well as to capture prismatic elements with the relatively high accuracy that contact metrology provides.

When combined as such, the AACMM and LLP may have the LLP carry out some or all of the processing of the 3D captured point cloud data using the signal processing electronics (e.g., computer or processor) within or associated with (e.g., located apart from) the AACMM. However, the LLP may have its own signal processing electronics located within the LLP or associated with the LLP (e.g., a stand-alone computer) to perform the necessary signal processing. In this case, the LLP may need to connect with a display device to view the captured data representing the object. Also, in this case the LLP may operate as a stand-alone device without the need to connect with an AACMM or similar device.

One important characteristic of any laser line probe is the dynamic range of the imaging device within the LLP. Simply put, the dynamic range of the imaging device is the range bounded on one end by the amount of relatively bright object surface portions that the imaging device is capable of accurately capturing and bounded on the other end by the amount of relatively dark object surface portions that the imaging device is capable of accurately capturing. Stated another way, the dynamic range of an imaging device is the ratio of the largest non-saturating input signal to the smallest detectable input signal. Dynamic range essentially quantifies the ability of an imaging sensor to adequately image both the highlights and the dark shadows of an object or of a larger scene. A typical real-world object or scene desired to be imaged may have a wide range of brightness values (or contrast variations) across the object surface or surfaces depending, in part, on the ambient light illuminating the object at any one point in time. For example, it is not uncommon for an object or scene to vary in brightness by 100 decibels or more.

The dynamic range required of an LLP for optimal determination of 3D coordinates of a surface is equal to the ratio of reflected optical power from the most reflective to the least reflective portions of an object surface. Dynamic range may be described as a linear ratio or, more commonly, as a logarithmic ratio in units of decibels ("dB"). The required dynamic range for a particular measurement depends partly on the material, color, and surface finish of the object surface, partly on the distances from a surface point to the projector and camera, and partly on the angles of incidence and reflectance of the projected and reflected light, respectively.

The dynamic range of an image sensor is the ratio of the largest optical energy to the smallest optical energy received by a sensing element within the image sensor. To provide a valid reading, the dynamic range received by a sensing element should be within the linear range of the sensing element, which is to say that the energy cannot be as large as to saturate or so small as to be noise limited. To perform at an optimal level, the dynamic range of the imaging device should be equal to or greater than the dynamic range required of a particular measurement. Most commercially available imaging devices, e.g., CCD's or CMOS imagers, have a dynamic range less than 100 decibels.

An LLP with a relatively low dynamic range imaging device (e.g., a CCD camera or CMOS photosensitive array) results in a reproduced image that may be too dark in some areas and/or too light (i.e., saturated) in other areas. Thus, it may be difficult, if not impossible, to accurately determine 3D coordinates with such an LLP.

As a result, many devices and techniques exist in the prior art for extending or increasing the dynamic range of imaging devices. However, these techniques and devices tend to be lacking somewhat in the amount of increase in the dynamic range of the imaging device.

While existing laser line probes are suitable for their intended purposes, what is needed is a laser line probe having an imaging device with improved (i.e., increased) high dynamic range.

SUMMARY OF THE INVENTION

According to one aspect of the invention, a method is provided for measuring three-dimensional (3D) coordinates of points on a surface of an object by providing a 3D coordinate measurement device, the device including a manually positionable articulated arm portion having opposed first and second ends, the second end coupled to a base, the arm portion including a plurality of connected arm segments, a laser line probe, and an electrical circuit, each of the arm segments including at least one position transducer configured to produce a position signal, the laser line probe coupled to the first end, the laser line probe including a projector and a camera, the projector separated from the camera by a baseline, the baseline being a line segment, the projector configured to project a line of light onto the surface, the camera including a lens and photosensitive array, the camera configured to form an image on the photosensitive array of the line of light projected onto the object, the photosensitive array having a plurality of pixels, each pixel configured to provide electrical signal levels for a plurality of colors, the camera configured to send the electrical signal levels from the pixels to the electrical circuit, the electrical circuit including a processor; projecting the line of light onto the surface; forming a color image of the line of light on the photosensitive array; sending to the electrical circuit an electrical signal in response to the color image, the electrical signal containing a signal level for each of the plurality of colors for each of the plurality of pixels; determining with the processor an effective illumination level for each pixel, the effective illumination level for each pixel based at least in part on the signal level for that pixel for each of the plurality of colors; and determining with the processor the 3D coordinates of points on the surface, the 3D coordinates based at least in part on a length of the baseline, an orientation of the projector to the baseline, an orientation of the camera to the baseline, the effective illumination level for each pixel, and the position signals.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES.

DETAILED DESCRIPTION

Figure 1A:
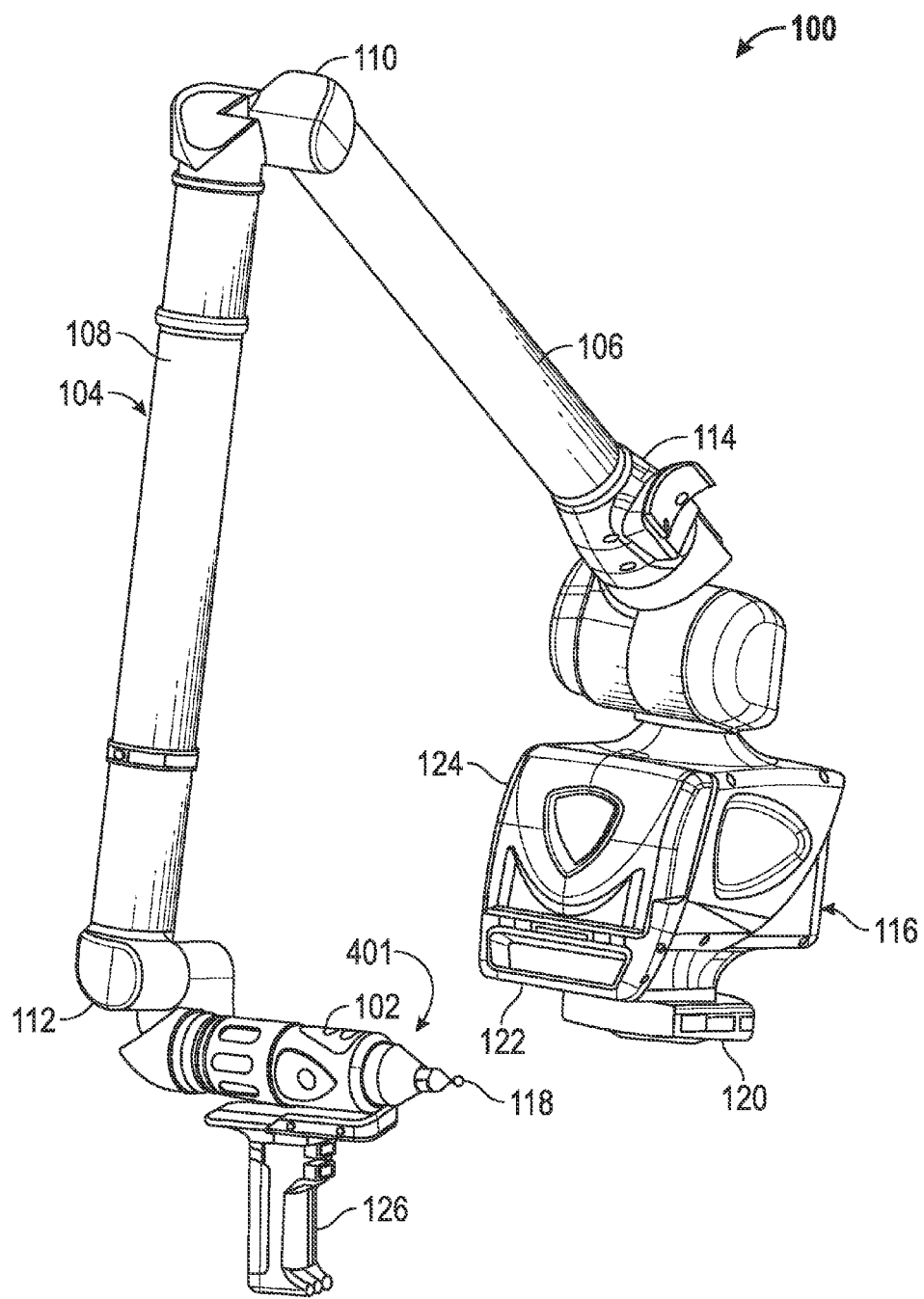
FIGS. 1A and 1B are perspective views of a portable articulated arm coordinate measuring machine ("AACMM") having embodiments of various aspects of the present invention therewithin.
Figure 1B:
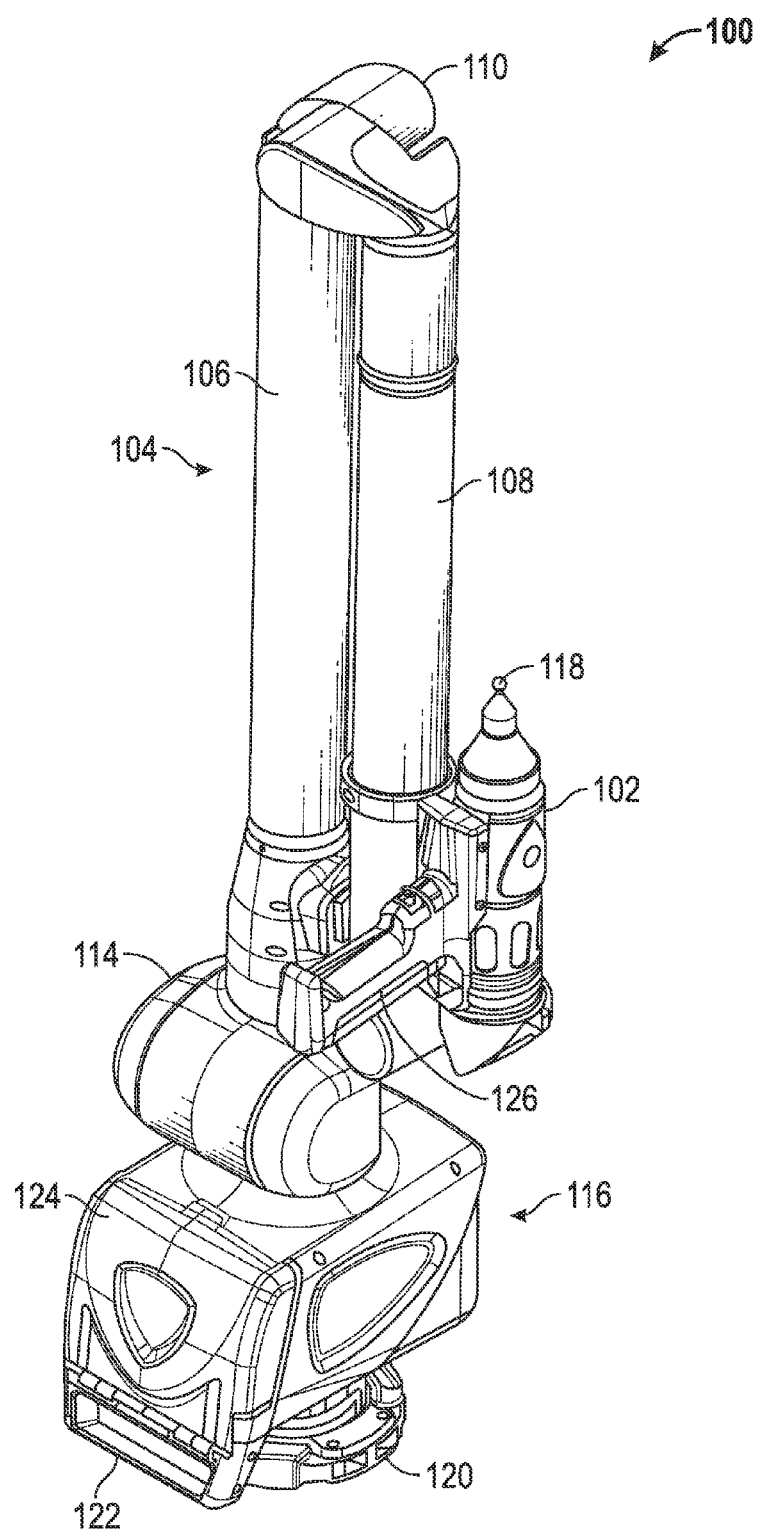

FIGS. 1A and 1B illustrate, in perspective, an articulated arm coordinate measuring machine ("AACMM") 100 according to various embodiments of the present invention, an articulated arm being one type of coordinate measuring machine. As shown in FIGS. 1A and 1B, the exemplary AACMM 100 may comprise a six or seven axis articulated measurement device having a probe end 401 that includes a measurement probe housing 102 coupled to an arm portion 104 of the AACMM 100 at one end. The arm portion 104 comprises a first arm segment 106 coupled to a second arm segment 108 by a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 provides for multiple axes of articulated movement. Also, the probe end 401 may include a measurement probe housing 102 that comprises the shaft of the seventh axis portion of the AACMM 100 (e.g., a cartridge containing an encoder system that determines movement of the measurement device, for example a probe 118, in the seventh axis of the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

The probe 118 is detachably mounted to the measurement probe housing 102, which is connected to bearing cartridge grouping 112. A handle 126 is removable with respect to the measurement probe housing 102 by way of, for example, a quick-connect interface. As discussed in more detail hereinafter with reference to FIG. 10 et seq., the handle 126 may be replaced or interchanged with another device such as a laser line probe ("LLP"), which is configured to emit a line of laser light to an object and to capture or image the laser light on a surface of the object with an imaging device (e.g., a camera) that is part of the LLP, to thereby provide for non-contact measurement of the dimensions of three-dimensional objects. This interchangeable feature and use of an LLP has the advantage in allowing the operator to make both contact and non-contact measurements with the same AACMM 100. However, it should be understood that the LLP may be a standalone device, as described in more detail hereinafter. That is, the LLP may be fully functional and operable by itself without any type of connection to the AACMM 100 or similar device.

In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as the LLP. In an embodiment, the handle 126 is replaced with the LLP using the quick-connect interface. Other types of measurement devices may replace the removable handle 126 to provide additional functionality. Examples of such measurement devices include, but are not limited to, one or more illumination lights, a temperature sensor, a thermal scanner, a bar code scanner, a projector, a paint sprayer, a camera, or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2D, the removable handle 126 may also include an electrical connector that allows electrical power and data to be exchanged with the handle 126 and the corresponding electronics located in the probe end 401.

In various embodiments, each grouping of bearing cartridges 110, 112, 114 allows the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail hereinafter. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ("the '582 patent").

The base 116 may include an attachment device or mounting device 120. The mounting device 120 allows the AACMM 100 to be removably mounted to a desired location, such as an inspection table, a machining center, a wall or the floor, for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic circuit having an electronic data processing system that includes two primary components: a base processing system that processes the data from the various encoder systems within the AACMM 100 as well as data representing other arm parameters to support three-dimensional ("3D") positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a laser line probe that can be mounted in place of the removable handle 126 on the AACMM 100). The electronics that support these peripheral hardware devices or features may be located in each of the bearing cartridge groupings 110, 112, 114 located within the portable AACMM 100.

Figure 2:
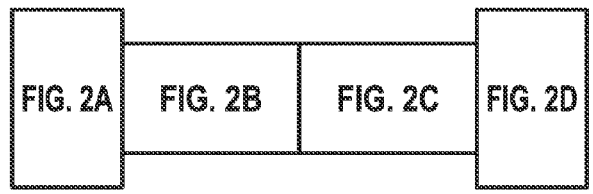
FIG. 2, including FIGS. 2A-2D taken together, is a block diagram of electronics utilized as part of the AACMM of FIGS. 1A and 1B in accordance with an embodiment.

FIG. 2 is a block diagram of electronics utilized in an AACMM 100 in accordance with an embodiment. The embodiment shown in FIG. 2A includes an electronic data processing system 210 including a base processor board 204 for implementing the base processing system, a user interface board 202, a base power board 206 for providing power, a Bluetooth module 232, and a base tilt board 208. The user interface board 202 includes a computer processor for executing application software to perform user interface, display, and other functions described herein.

Figure 2A:
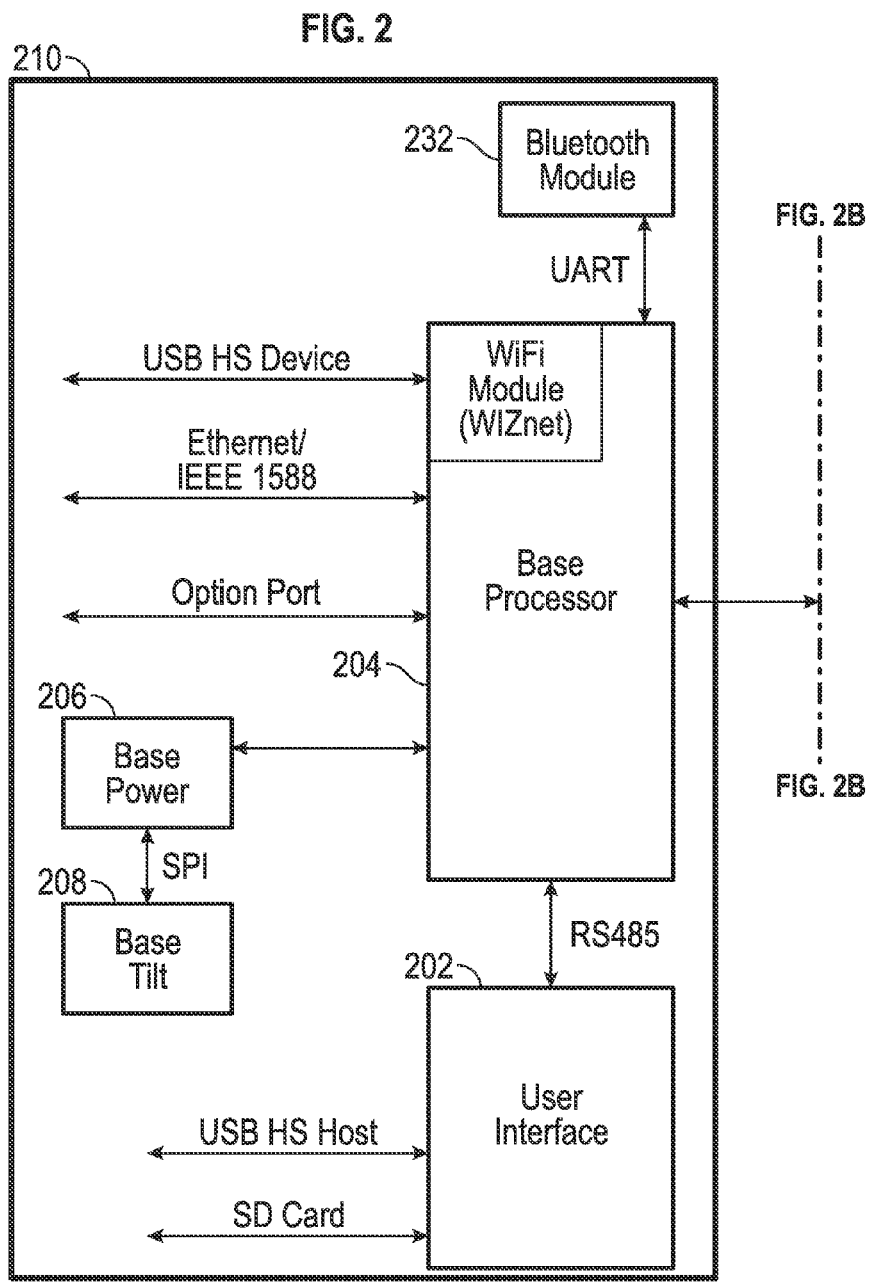
Figure 2B:
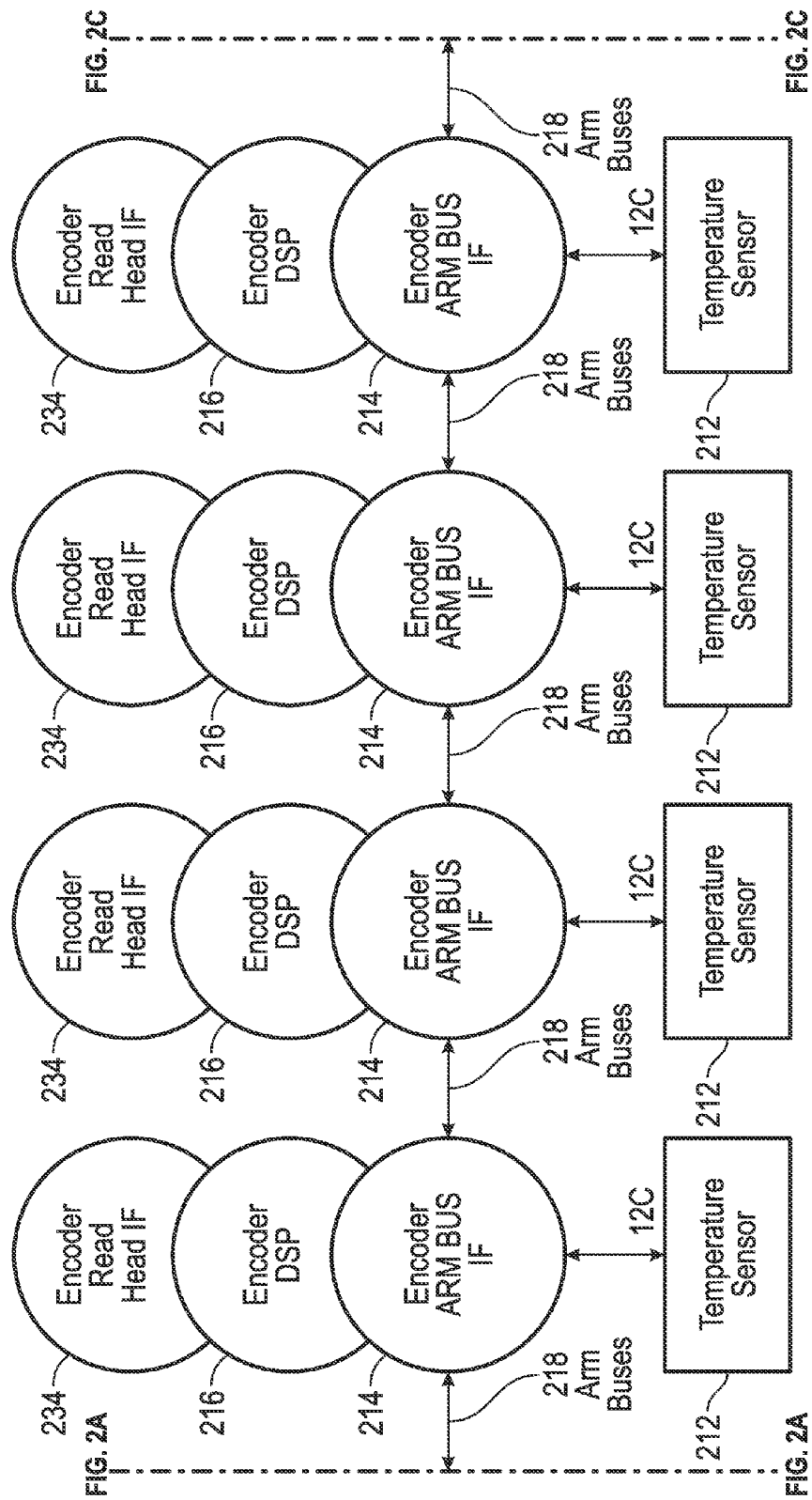
Figure 2C:
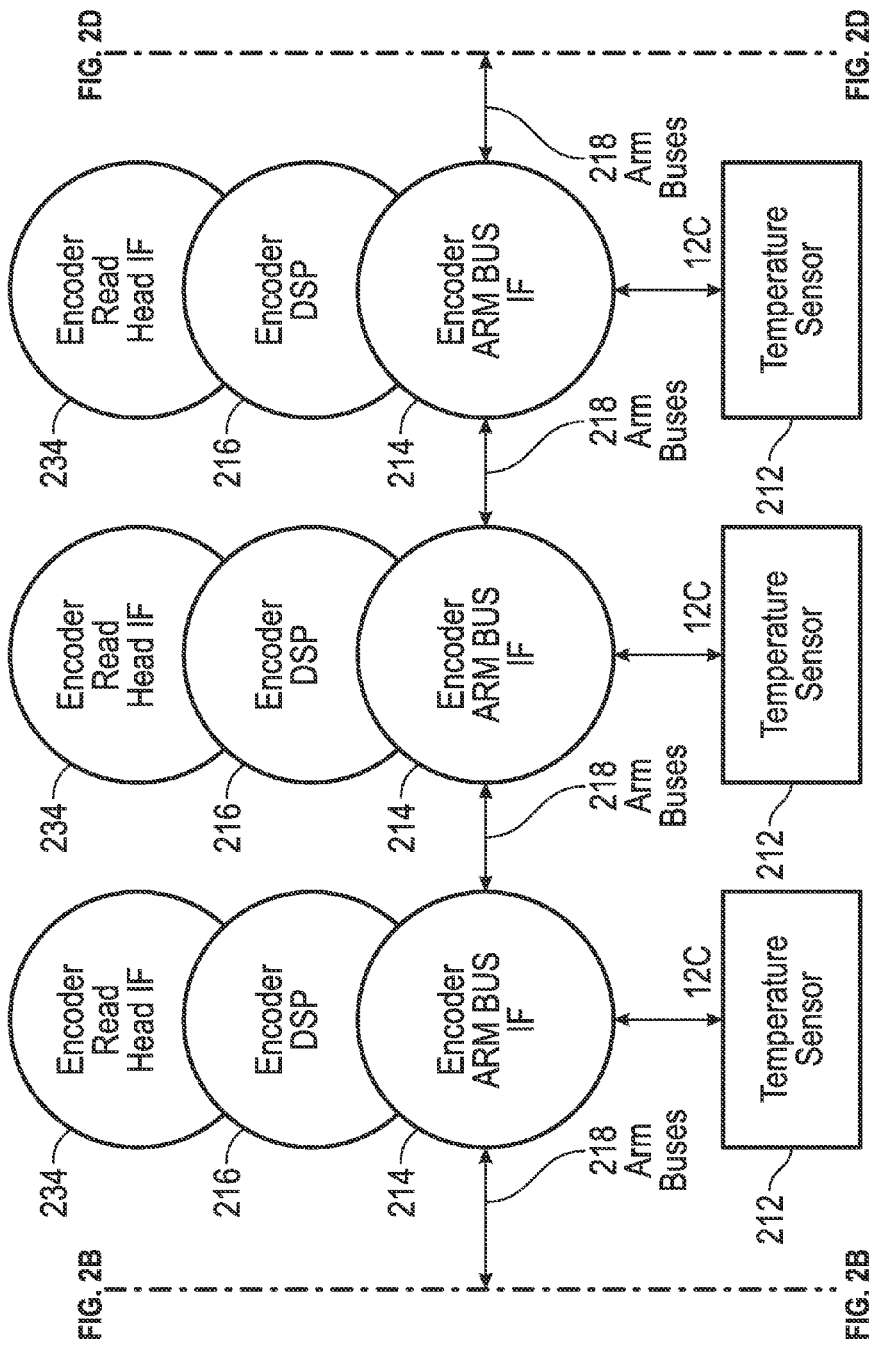

As shown in FIG. 2A and FIG. 2B, the electronic data processing system 210 is in communication with the aforementioned plurality of encoder systems via one or more arm buses 218. In the embodiment depicted in FIG. 2B and FIG. 2C, each encoder system generates encoder data and includes: an encoder arm bus interface 214, an encoder digital signal processor ("DSP") 216, an encoder read head interface 234, and a temperature sensor 212. Other devices, such as strain sensors, may be attached to the arm bus 218.

Figure 2D:
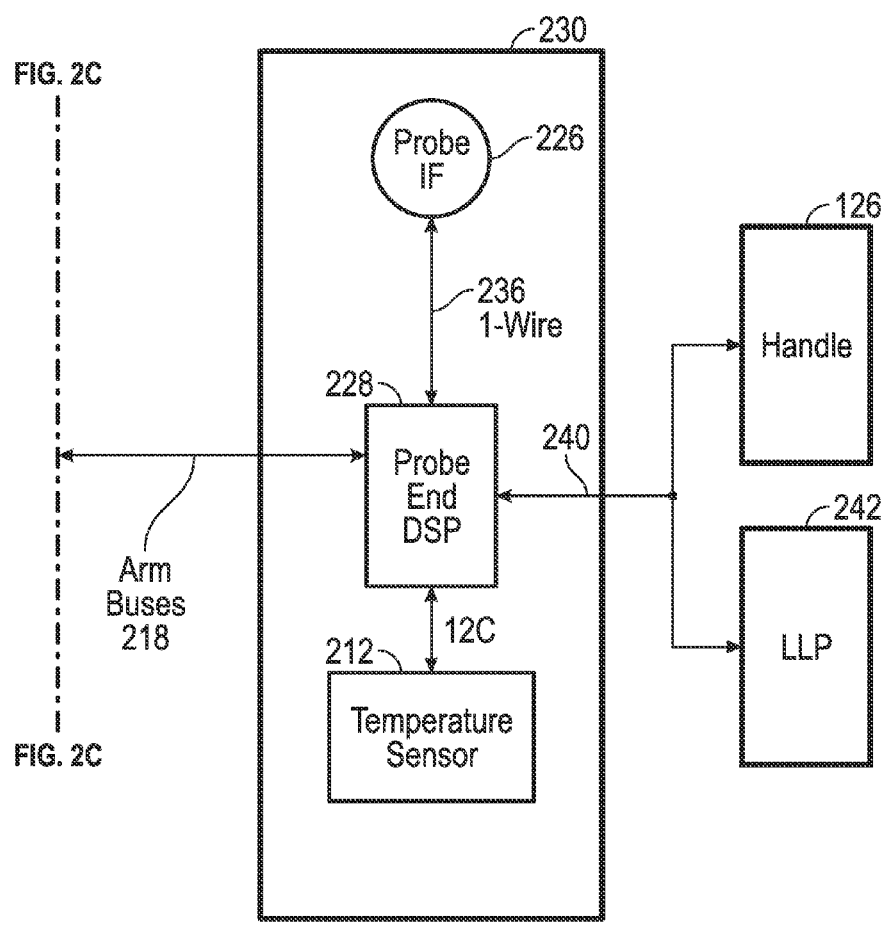

Also shown in FIG. 2D are probe end electronics 230 that are in communication with the arm bus 218. The probe end electronics 230 include a probe end DSP 228, a temperature sensor 212, a handle/device interface bus 240 that connects with the handle 126 or the laser line probe ("LLP") 242 via the quick-connect interface in an embodiment, and a probe interface 226. The quick-connect interface allows access by the handle 126 to the data bus, control lines, and power bus used by the LLP 242 and other accessories. In an embodiment, the probe end electronics 230 are located in the measurement probe housing 102 on the AACMM 100. In an embodiment, the handle 126 may be removed from the quick-connect interface and measurement may be performed by the LLP 242 communicating with the probe end electronics 230 of the AACMM 100 via the interface bus 240. In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-Wire® communications protocol 236.

FIG. 3 is a block diagram describing detailed features of the electronic data processing system 210 of the AACMM 100 in accordance with an embodiment. In an embodiment, the electronic data processing system 210 is located in the base 116 of the AACMM 100 and includes the base processor board 204, the user interface board 202, a base power board 206, a Bluetooth module 232, and a base tilt module 208.

In an embodiment shown in FIG. 3A, the base processor board 204 includes the various functional blocks illustrated therein. For example, a base processor function 302 is utilized to support the collection of measurement data from the AACMM 100 and receives raw arm data (e.g., encoder system data) via the arm bus 218 and a bus control module function 308. The memory function 304 stores programs and static arm configuration data. The base processor board 204 also includes an external hardware option port function 310 for communicating with any external hardware devices or accessories such as the LLP 242. A real time clock ("RTC") and log 306, a battery pack interface ("IF") 316, and a diagnostic port 318 are also included in the functionality in an embodiment of the base processor board 204 depicted in FIG. 3A.

The base processor board 204 also manages all the wired and wireless data communication with external (host computer) and internal (display processor 202) devices. The base processor board 204 has the capability of communicating with an Ethernet network via an Ethernet function 320 (e.g., using a clock synchronization standard such as Institute of Electrical and Electronics Engineers ("IEEE") 1588), with a wireless local area network ("WLAN") via a LAN function 322, and with Bluetooth module 232 via a parallel to serial communications ("PSC") function 314. The base processor board 204 also includes a connection to a universal serial bus ("USB") device 312.

The base processor board 204 transmits and collects raw measurement data (e.g., encoder system counts, temperature readings) for processing into measurement data without the need for any preprocessing, such as disclosed in the serial box of the aforementioned '582 patent. The base processor 204 sends the processed data to the display processor 328 on the user interface board 202 via an RS485 interface ("IF") 326. In an embodiment, the base processor 204 also sends the raw measurement data to an external computer.

Figure 3B:
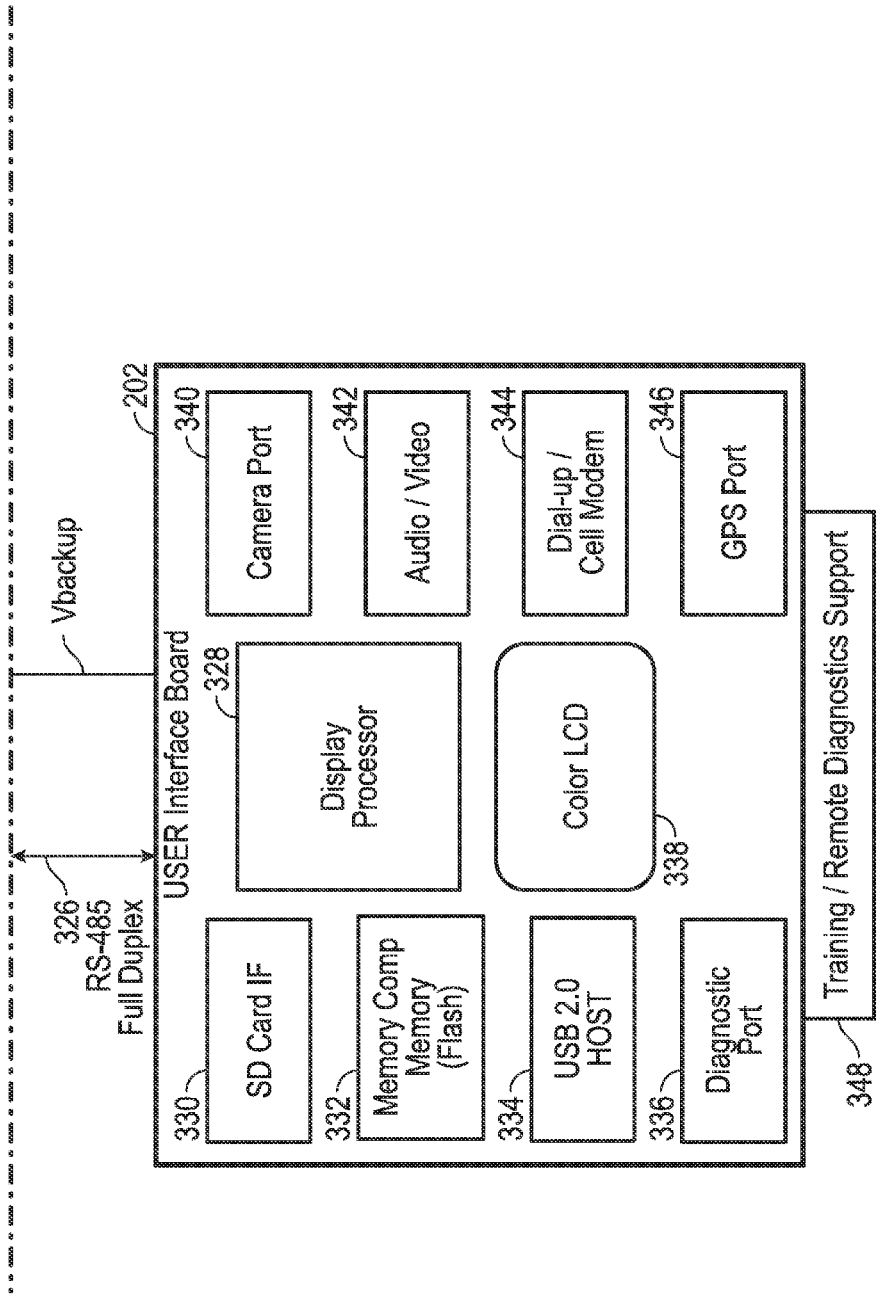
FIG. 3, including FIGS. 3A and 3B taken together, is a block diagram describing detailed features of the electronic data processing system of FIG. 2 in accordance with an embodiment.
Figure 4:
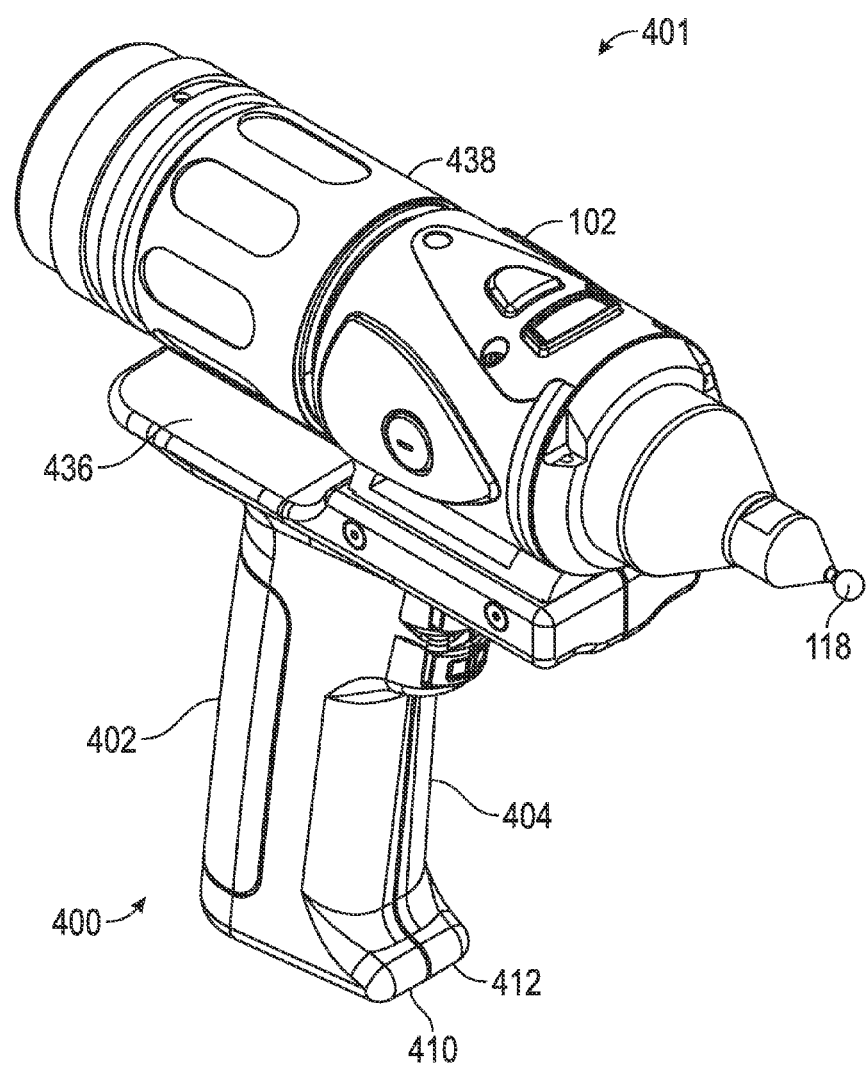
FIG. 4 is an isometric view of the probe end of the AACMM of FIGS. 1A and 1B.

Turning now to the user interface board 202 in FIG. 3B, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display ("LCD") 338 (e.g., a touch screen LCD) user interface, the user interface board 202 includes several interface options including a secure digital ("SD") card interface 330, a memory 332, a USB Host interface 334, a diagnostic port 336, a camera port 340, an audio/video interface 342, a dial-up/cell modem 344 and a global positioning system ("GPS") port 346.

The electronic data processing system 210 shown in FIG. 3A also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit ("I2C") serial single ended bus 354 as well as via a DMA serial peripheral interface ("DSPI") 357. The base power board 206 is connected to a tilt sensor and radio frequency identification ("RFID") module 208 via an input/output ("I/O") expansion function 364 implemented in the base power board 206.

Though shown as separate components, in other embodiments all or a subset of the components may be physically located in different locations and/or functions combined in different manners than that shown in FIG. 3A and FIG. 3B. For example, in one embodiment, the base processor board 204 and the user interface board 202 are combined into one physical board.

Figure 7:
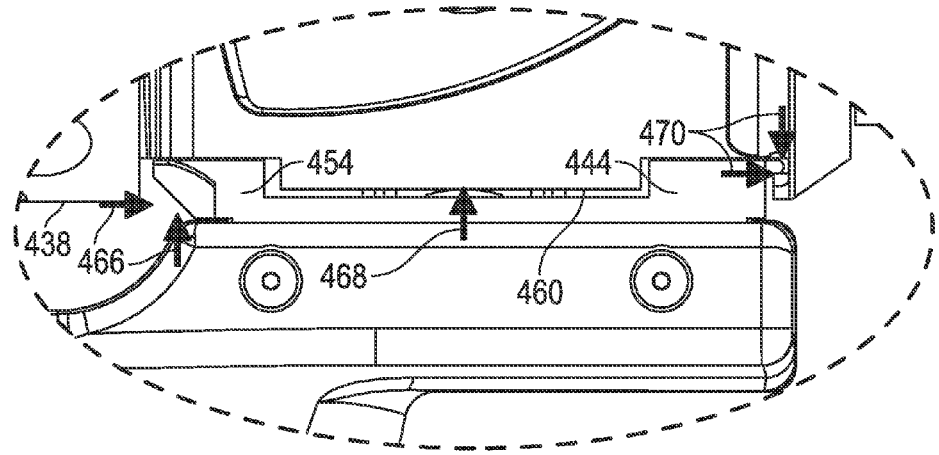
FIG. 7 is an enlarged partial side view of the interface portion of the probe end of FIG. 6.
Figure 8:
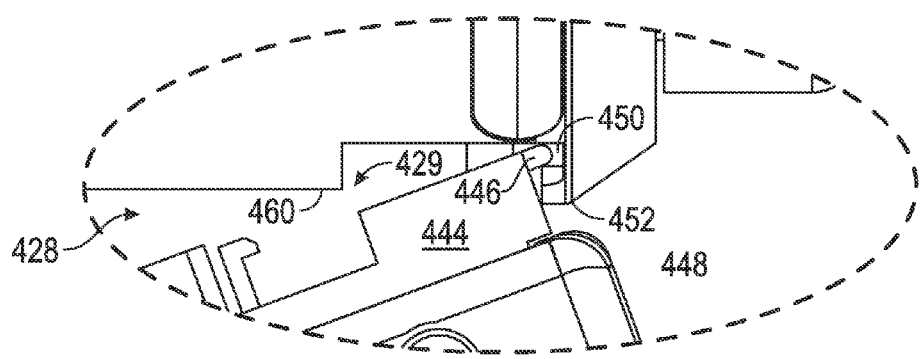
FIG. 8 is another enlarged partial side view of the interface portion of the probe end of FIG. 5.
Figure 9:
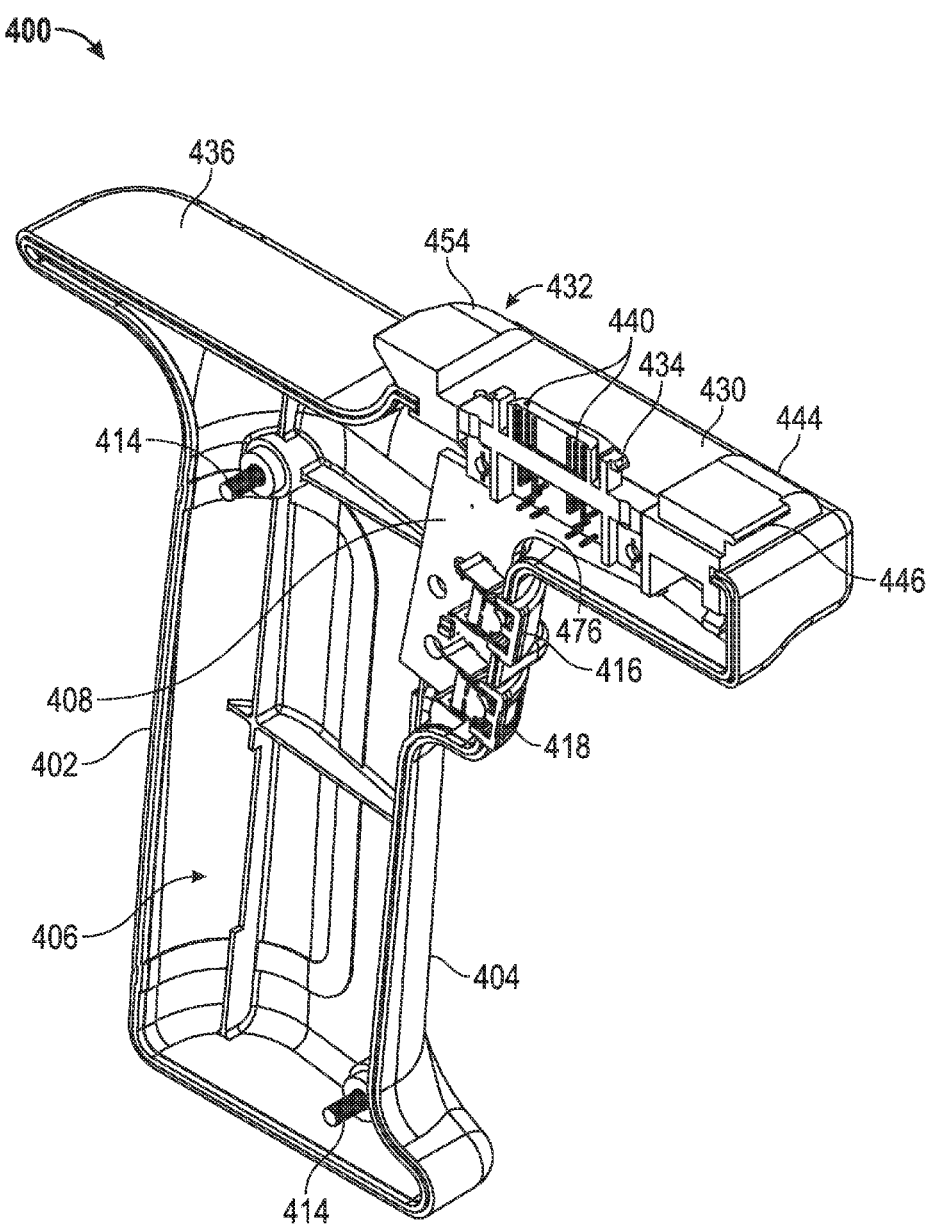
FIG. 9 is an isometric view partially in section of the handle of FIG. 4.

Referring now to FIGS. 4-9, an exemplary embodiment of a probe end 401 is illustrated having a measurement probe housing 102 with a quick-connect mechanical and electrical interface that allows removable and interchangeable device 400 to couple with AACMM 100. In the exemplary embodiment, the device 400 includes an enclosure 402 that includes a handle portion 404 that is sized and shaped to be held in an operator's hand, such as in a pistol grip for example. The enclosure 402 is a thin wall structure having a cavity 406 (FIG. 9). The cavity 406 is sized and configured to receive a controller 408. The controller 408 may be a digital circuit, having a microprocessor for example, or an analog circuit. In one embodiment, the controller 408 is in asynchronous bidirectional communication with the electronic data processing system 210 (FIGS. 2 and 3). The communication connection between the controller 408 and the electronic data processing system 210 may be wired (e.g. via controller 420) or may be a direct or indirect wireless connection (e.g. Bluetooth or IEEE 802.11) or a combination of wired and wireless connections. In the exemplary embodiment, the enclosure 402 is formed in two halves 410, 412, such as from an injection molded plastic material for example. The halves 410, 412 may be secured together by fasteners, such as screws 414 for example. In other embodiments, the enclosure halves 410, 412 may be secured together by adhesives or ultrasonic welding for example.

The handle portion 404 also includes buttons or actuators 416, 418 that may be manually activated by the operator. The actuators 416, 418 are coupled to the controller 408 that transmits a signal to a controller 420 within the probe housing 102. In the exemplary embodiments, the actuators 416, 418 perform the functions of actuators 422, 424 located on the probe housing 102 opposite the device 400. It should be appreciated that the device 400 may have additional switches, buttons or other actuators that may also be used to control the device 400, the AACMM 100 or vice versa. Also, the device 400 may include indicators, such as LEDs, sound generators, meters, displays or gauges for example. In one embodiment, the device 400 may include a digital voice recorder that allows for synchronization of verbal comments with a measured point. In yet another embodiment, the device 400 includes a microphone that allows the operator to transmit voice activated commands to the electronic data processing system 210.

In one embodiment, the handle portion 404 may be configured to be used with either operator hand or for a particular hand (e.g. left handed or right handed). The handle portion 404 may also be configured to facilitate operators with disabilities (e.g. operators with missing finders or operators with prosthetic arms). Further, the handle portion 404 may be removed and the probe housing 102 used by itself when clearance space is limited. As discussed above, the probe end 401 may also comprise the shaft of the seventh axis of AACMM 100. In this embodiment the device 400 may be arranged to rotate about the AACMM seventh axis.

The probe end 401 includes a mechanical and electrical interface 426 having a first connector 429 (FIG. 8) on the device 400 that cooperates with a second connector 428 on the probe housing 102. The connectors 428, 429 may include electrical and mechanical features that allow for coupling of the device 400 to the probe housing 102. In one embodiment, the interface 426 includes a first surface 430 having a mechanical coupler 432 and an electrical connector 434 thereon. The enclosure 402 also includes a second surface 436 positioned adjacent to and offset from the first surface 430. In the exemplary embodiment, the second surface 436 is a planar surface offset a distance of approximately 0.5 inches from the first surface 430. This offset provides a clearance for the operator's fingers when tightening or loosening a fastener such as collar 438. The interface 426 provides for a relatively quick and secure electronic connection between the device 400 and the probe housing 102 without the need to align connector pins, and without the need for separate cables or connectors.

The electrical connector 434 extends from the first surface 430 and includes one or more connector pins 440 that are electrically coupled in asynchronous bidirectional communication with the electronic data processing system 210 (FIGS. 2 and 3), such as via one or more arm buses 218 for example. The bidirectional communication connection may be wired (e.g. via arm bus 218), wireless (e.g. Bluetooth or IEEE 802.11), or a combination of wired and wireless connections. In one embodiment, the electrical connector 434 is electrically coupled to the controller 420. The controller 420 may be in asynchronous bidirectional communication with the electronic data processing system 210 such as via one or more arm buses 218 for example. The electrical connector 434 is positioned to provide a relatively quick and secure electronic connection with electrical connector 442 on probe housing 102. The electrical connectors 434, 442 connect with each other when the device 400 is attached to the probe housing 102. The electrical connectors 434, 442 may each comprise a metal encased connector housing that provides shielding from electromagnetic interference as well as protecting the connector pins and assisting with pin alignment during the process of attaching the device 400 to the probe housing 102.

The mechanical coupler 432 provides relatively rigid mechanical coupling between the device 400 and the probe housing 102 to support relatively precise applications in which the location of the device 400 on the end of the arm portion 104 of the AACMM 100 preferably does not shift or move. Any such movement may typically cause an undesirable degradation in the accuracy of the measurement result. These desired results are achieved using various structural features of the mechanical attachment configuration portion of the quick connect mechanical and electronic interface of an embodiment of the present invention.

In one embodiment, the mechanical coupler 432 includes a first projection 444 positioned on one end 448 (the leading edge or "front" of the device 400). The first projection 444 may include a keyed, notched or ramped interface that forms a lip 446 that extends from the first projection 444. The lip 446 is sized to be received in a slot 450 defined by a projection 452 extending from the probe housing 102 (FIG. 8). It should be appreciated that the first projection 444 and the slot 450 along with the collar 438 form a coupler arrangement such that when the lip 446 is positioned within the slot 450, the slot 450 may be used to restrict both the longitudinal and lateral movement of the device 400 when attached to the probe housing 102. As will be discussed in more detail below, the rotation of the collar 438 may be used to secure the lip 446 within the slot 450.

Figure 5:
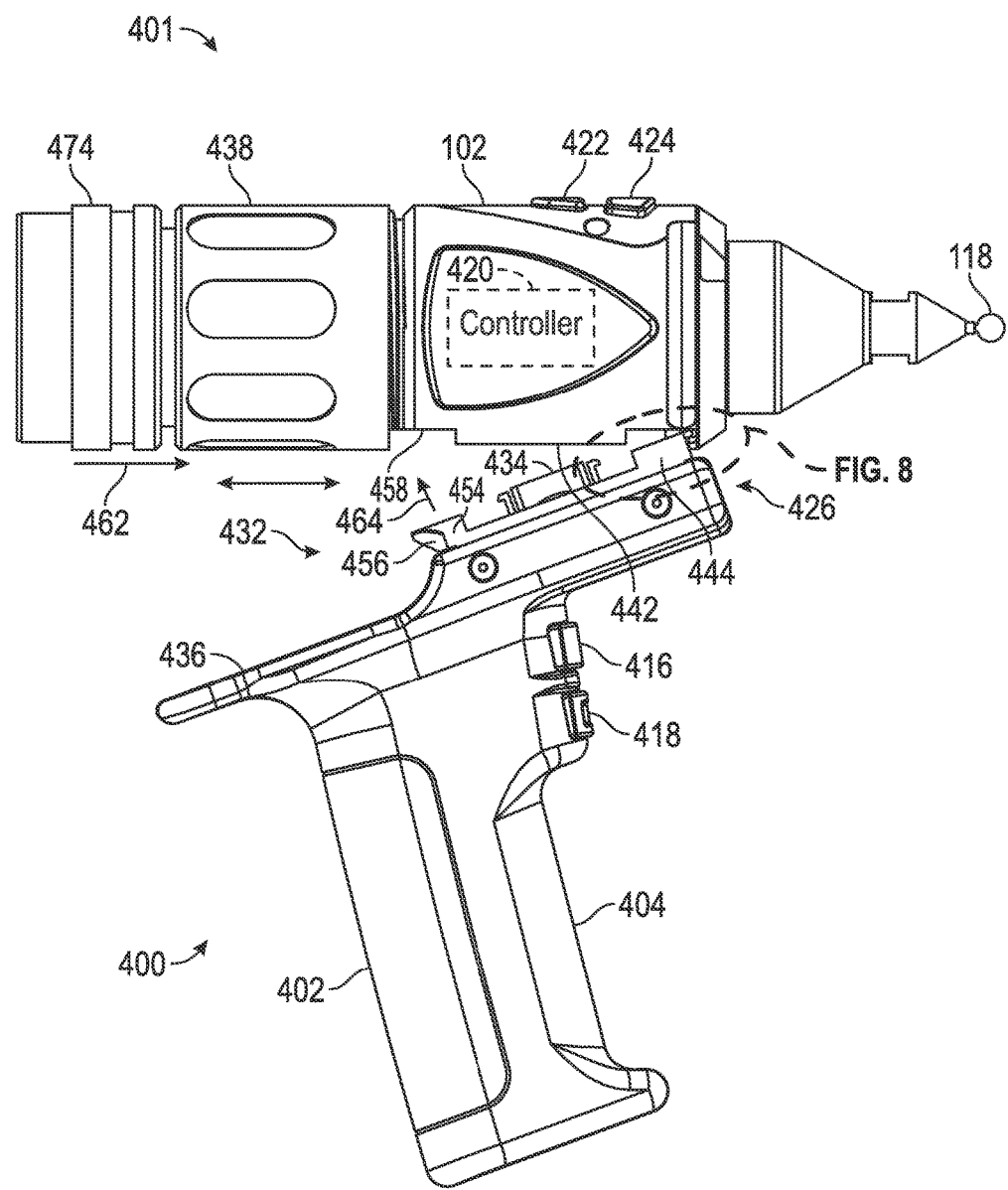
FIG. 5 is a side view of the probe end of FIG. 4 with the handle being coupled thereto.

Opposite the first projection 444, the mechanical coupler 432 may include a second projection 454. The second projection 454 may have a keyed, notched-lip or ramped interface surface 456 (FIG. 5). The second projection 454 is positioned to engage a fastener associated with the probe housing 102, such as collar 438 for example. As will be discussed in more detail below, the mechanical coupler 432 includes a raised surface projecting from surface 430 that is adjacent to or disposed about the electrical connector 434 which provides a pivot point for the interface 426 (FIGS. 7 and 8). This serves as the third of three points of mechanical contact between the device 400 and the probe housing 102 when the device 400 is attached thereto.

The probe housing 102 includes a collar 438 arranged co-axially on one end. The collar 438 includes a threaded portion that is movable between a first position (FIG. 5) and a second position (FIG. 7). By rotating the collar 438, the collar 438 may be used to secure or remove the device 400 without the need for external tools. Rotation of the collar 438 moves the collar 438 along a relatively coarse, square-threaded cylinder 474. The use of such relatively large size, square-thread and contoured surfaces allows for significant clamping force with minimal rotational torque. The coarse pitch of the threads of the cylinder 474 further allows the collar 438 to be tightened or loosened with minimal rotation.

Figure 6:
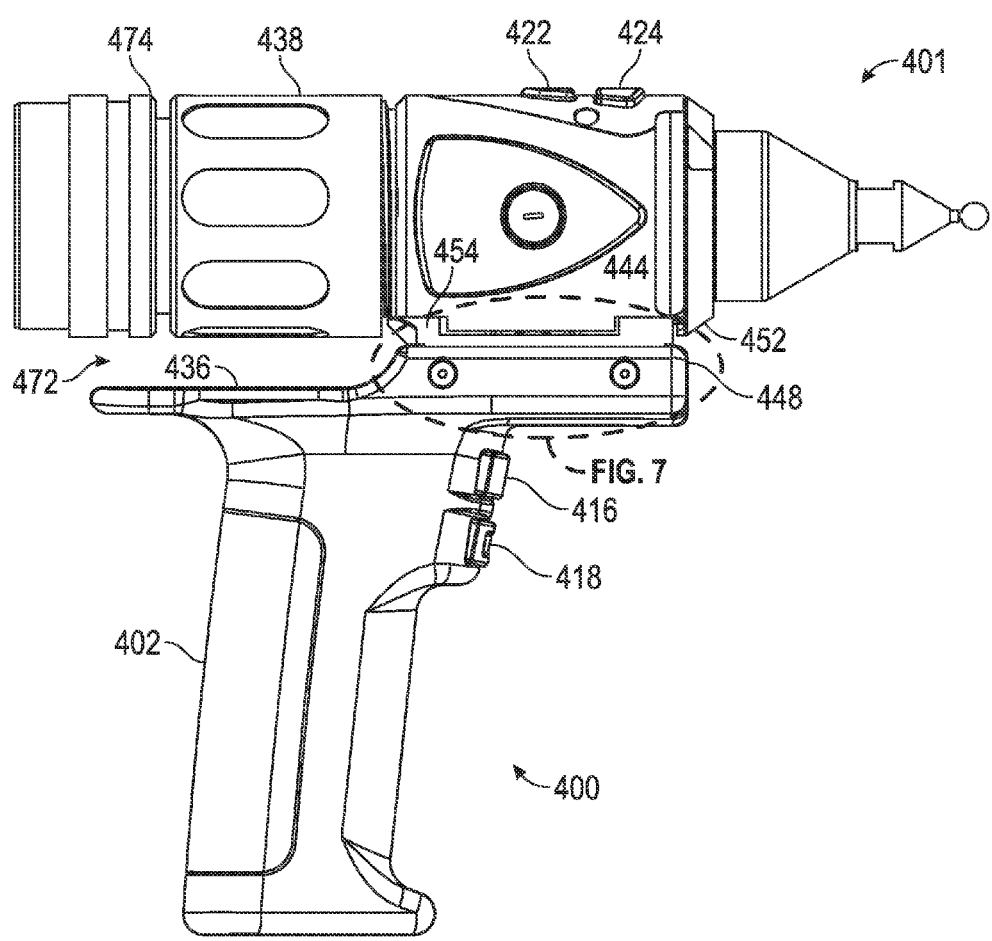
FIG. 6 is a side view of the probe end of FIG. 4 with the handle attached.

To couple the device 400 to the probe housing 102, the lip 446 is inserted into the slot 450 and the device is pivoted to rotate the second projection 454 toward surface 458 as indicated by arrow 464 (FIG. 5). The collar 438 is rotated causing the collar 438 to move or translate in the direction indicated by arrow 462 into engagement with surface 456. The movement of the collar 438 against the angled surface 456 drives the mechanical coupler 432 against the raised surface 460. This assists in overcoming potential issues with distortion of the interface or foreign objects on the surface of the interface that could interfere with the rigid seating of the device 400 to the probe housing 102. The application of force by the collar 438 on the second projection 454 causes the mechanical coupler 432 to move forward pressing the lip 446 into a seat on the probe housing 102. As the collar 438 continues to be tightened, the second projection 454 is pressed upward toward the probe housing 102 applying pressure on a pivot point. This provides a see-saw type arrangement, applying pressure to the second projection 454, the lip 446 and the center pivot point to reduce or eliminate shifting or rocking of the device 400. The pivot point presses directly against the bottom on the probe housing 102 while the lip 446 is applies a downward force on the end of probe housing 102. FIG. 5 includes arrows 462, 464 to show the direction of movement of the device 400 and the collar 438. FIG. 7 includes arrows 466, 468, 470 to show the direction of applied pressure within the interface 426 when the collar 438 is tightened. It should be appreciated that the offset distance of the surface 436 of device 400 provides a gap 472 between the collar 438 and the surface 436 (FIG. 6). The gap 472 allows the operator to obtain a firmer grip on the collar 438 while reducing the risk of pinching fingers as the collar 438 is rotated. In one embodiment, the probe housing 102 is of sufficient stiffness to reduce or prevent the distortion when the collar 438 is tightened.

Embodiments of the interface 426 allow for the proper alignment of the mechanical coupler 432 and electrical connector 434 and also protect the electronics interface from applied stresses that may otherwise arise due to the clamping action of the collar 438, the lip 446 and the surface 456. This provides advantages in reducing or eliminating stress damage to circuit board 476 mounted electrical connectors 434, 442 that may have soldered terminals. Also, embodiments provide advantages over known approaches in that no tools are required for a user to connect or disconnect the device 400 from the probe housing 102. This allows the operator to manually connect and disconnect the device 400 from the probe housing 102 with relative ease.

Due to the relatively large number of shielded electrical connections possible with the interface 426, a relatively large number of functions may be shared between the AACMM 100 and the device 400. For example, switches, buttons or other actuators located on the AACMM 100 may be used to control the device 400 or vice versa. Further, commands and data may be transmitted from electronic data processing system 210 to the device 400. In one embodiment, the device 400 is a video camera that transmits data of a recorded image to be stored in memory on the base processor 204 or displayed on the display 328. In another embodiment the device 400 is an image projector that receives data from the electronic data processing system 210. In addition, temperature sensors located in either the AACMM 100 or the device 400 may be shared by the other. It should be appreciated that embodiments of the present invention provide advantages in providing a flexible interface that allows a wide variety of accessory devices 400 to be quickly, easily and reliably coupled to the AACMM 100. Further, the capability of sharing functions between the AACMM 100 and the device 400 may allow a reduction in size, power consumption and complexity of the AACMM 100 by eliminating duplicity.

In one embodiment, the controller 408 may alter the operation or functionality of the probe end 401 of the AACMM 100. For example, the controller 408 may alter indicator lights on the probe housing 102 to either emit a different color light, a different intensity of light, or turn on/off at different times when the device 400 is attached versus when the probe housing 102 is used by itself. In one embodiment, the device 400 includes a range finding sensor (not shown) that measures the distance to an object. In this embodiment, the controller 408 may change indicator lights on the probe housing 102 in order to provide an indication to the operator how far away the object is from the probe tip 118. In another embodiment, the controller 408 may change the color of the indicator lights based on the quality of the image acquired by the LLP 242. This provides advantages in simplifying the requirements of controller 420 and allows for upgraded or increased functionality through the addition of accessory devices.

Figure 10:
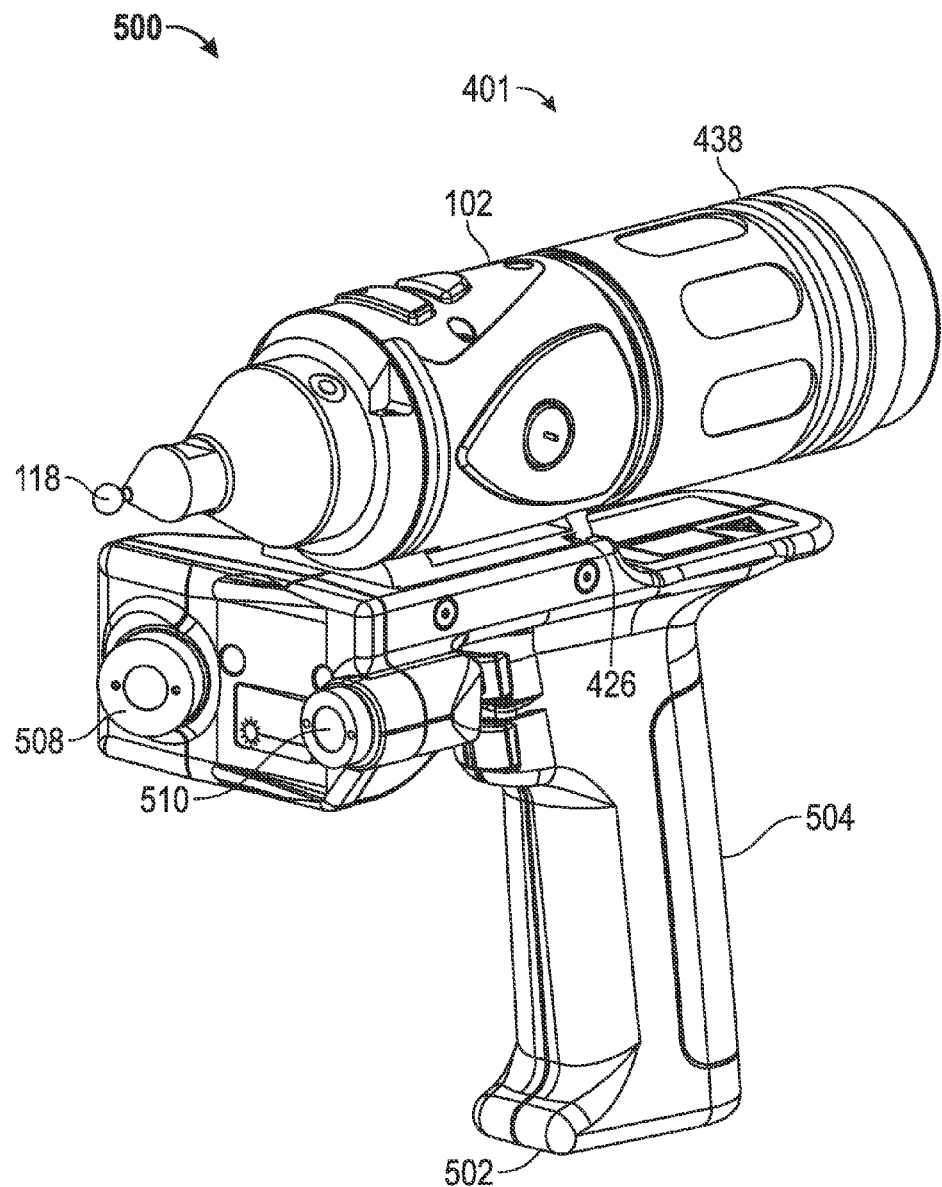
FIG. 10 is an isometric view of the probe end of the AACMM of FIGS. 1A and 1B with a laser line probe having a single camera attached.
Figure 11:
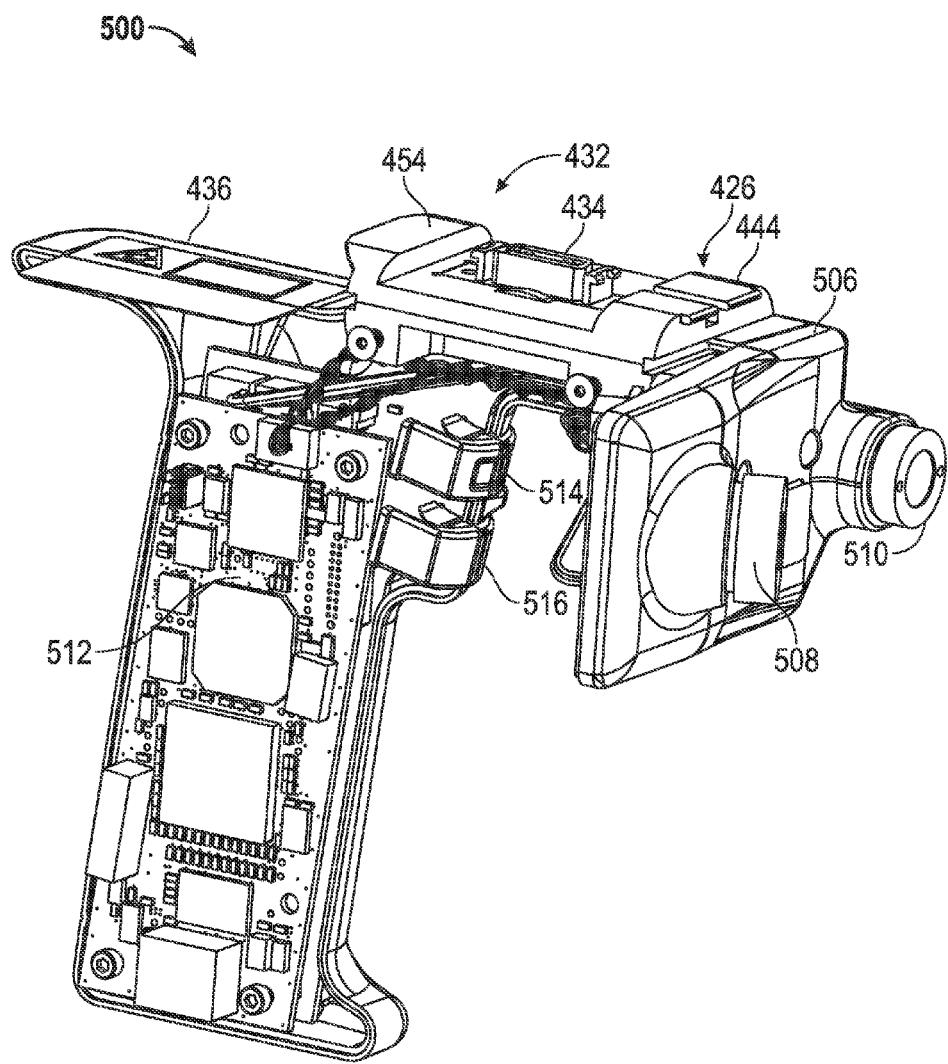
FIG. 11 is an isometric view partially in section of the laser line probe of FIG. 10.

Referring to FIGS. 10-11, embodiments of the present invention provide advantages for increasing the dynamic range of a laser line probe ("LLP") 500, which may be part of a measurement unit such as the AACMM 100 or part of a non-measurement unit such as a robot or other device that moves in a linear and/or a non-linear manner. In the alternative, the LLP 500 may be a hand-held, standalone device not connected with the AACMM 100 or any other device. The LLP 500 may be the same as or somewhat similar to the LLP 242 as referenced hereinabove with respect to FIGS. 1A, 1B-9 in particular, or may be some other type of laser line scanner in general.

The LLP 500 provides for non-contact measurements of the regular and/or irregular surface features of an object, typically, if connected with the AACMM 100, in the same frame of reference as that of the hard probe 118 of the AACMM 100, as discussed hereinabove. Further, the calculated three-dimensional coordinates of the surface points of the object provided by the LLP 500 are based on the known principles of triangulation, as was explained in more detail hereinabove. The LLP 500 may include an enclosure 502 with a handle portion 504. The LLP 500 may also include an interface 426 on one end that mechanically and electrically couples the LLP 500 to the probe housing 102 as described hereinabove. The interface 426 allows the LLP 500 to be coupled and removed from the AACMM 100 quickly and easily without requiring additional tools.

Adjacent the interface 426, the enclosure 502 has a portion 506 that includes a projector 508 and a camera 510. In the exemplary embodiment, the projector 508 uses a light source that generates a straight line or "stripe" which is projected onto an object surface. The light source may be, for example and without limitation, a laser, a superluminescent diode ("SLD"), an incandescent light, a light emitting diode ("LED"), or some other similar type of light projecting or emitting device. The projected light may be visible or invisible, but visible light may be more convenient and advantageous to use in some cases. As the LLP 500 is moved by moving the AACMM 100 or by moving the standalone LLP 500 by hand, the projected line or stripe eventually covers the entire surface area or a desired portion of the surface area of the object whose surface physical characteristics are being measured. This is done in relatively small, cross-section segments or increments, each increment being represented by the projected line or stripe at one location on the surface of the object.

The camera 510 typically includes a lens or lens system and a solid state, digital imaging sensor. The lens or lens system is typically used to filter out ambient light. The digital imaging sensor is typically a photosensitive array that may be a charge-coupled device ("CCD") two-dimensional ("2D") area sensor or a complementary metal-oxide-semiconductor ("CMOS") 2D area sensor, for example, or it may be some other type of light capture device. Each imaging sensor may comprise a 2D array (i.e., rows, columns) having a plurality of light sensing elements. Each light sensing element typically contains or comprises at least one photodetector (e.g., photodiode) that converts the captured or sensed light energy (i.e., photons) into an amount of electric charge which is stored within the corresponding well within each light sensing element, where the charge in each well may be added or integrated and read out as a voltage value. The voltage values are typically converted into digital values for manipulation by a computer or processor by an analog-to-digital converter ("ADC"). Each digital value represents an amount of brightness at a particular physical location on the surface of the object as imaged by the sensor from the light reflected off of the object surface and captured by the digital imaging sensor at a particular location within the photosensitive array. Typically for a CMOS imaging sensor chip, the ADC is contained within the sensor chip, while for a CCD imaging sensor chip, the ADC is usually included outside the sensor chip on a circuit board.

Use of these types of digital imaging sensors most often leads to relatively low overall dynamic range in the LLP 500. As stated hereinabove, simply put, the dynamic range of the digital imaging device is the range bounded on one end by the amount of relatively bright object surface portions that the imaging device is capable of accurately capturing and bounded on the other end by the amount of relatively dark object surface portions that the imaging device is capable of accurately capturing. Stated another way, the dynamic range of the imaging device is the ratio of the largest non-saturating input signal to the smallest detectable input signal (i.e., such detectable signal being distinguishable from an amount of noise typically residing at the low input signal levels).

Defined as such, relatively low dynamic range is usually caused by the fact that the digital output of the digital imaging sensor from the ADC is often only characterized by eight binary bits, which results in the relatively small value of 256 different levels of brightness information being able to be provided by the digital imaging sensor. Thus, a typical real world object scanned by the LLP 500 most often results in the resulting scanned image being relatively too bright in some areas and/or relatively too dark in other areas. In other words, the LLP 500 does a relatively poor job of accurately imaging the real world object because the digital imaging sensor does not contain enough resolution (i.e., enough binary output bits) to accurately image or represent both the relatively light and dark areas of the object. Embodiments of the present invention described and illustrated herein provide for improvements or increases in the dynamic range of the LLP 500.

In an exemplary embodiment, the projector 508 and camera 510 are oriented to enable reflected light from an object to be imaged by the photosensitive array. In one embodiment, the LLP 500 is offset from the probe tip 118 to enable the LLP 500 to be operated without interference from the probe tip 118. In other words, the LLP 500 may be operated with the probe tip 118 in place. Further, it should be appreciated that the LLP 500 is substantially fixed relative to the probe tip 118 so that forces on the handle portion 504 do not influence the alignment of the LLP 500 relative to the probe tip 118. In one embodiment, the LLP 500 may have an additional actuator (not shown) that allows the operator to switch between acquiring data from the LLP 500 and from the probe tip 118.

The projector 508 and camera 510 are electrically coupled to a controller 512 disposed within the enclosure 502. The controller 512 may include one or more microprocessors, digital signal processors, memory, and other types of signal processing and/or conditioning circuits and/or storage circuits. Due to the relatively large data volume typically generated by the LLP 500 when line scanning an object, the controller 512 may be arranged within the handle portion 504. The controller 512 may be electrically coupled to the arm buses 218 via electrical connector 434. The LLP 500 may further include actuators 514, 516 which may be manually activated by the operator to initiate operation and data capture by the LLP 500.

If the LLP 500 is connected with a device such as the AACMM 100 as described hereinbefore, then some or all of the relatively large amount of signal processing required by the LLP 500 may be carried out by the electronic data processing system 210 within the AACMM 100. The signal processing required typically involves processing the raw point cloud data of the object captured by the digital imaging sensor of the camera 510 to determine the resulting image of the object through use of, e.g., triangulation techniques. In this case, some of the data processing may also be carried out by the controller 512 within the handle 504 of the LLP 500. In the alternative, if the LLP 500 is a standalone device, then all of the required signal processing may be carried out by the controller 512 and/or by additional signal processing components located within the handle 504 of the LLP 500.

The laser line probe ("LLP") in accordance with the aforementioned embodiments of FIGS. 10-11 may be utilized in embodiments of the present invention involving LLPs in particular (and line scanners in general) having increased high dynamic range ("HDR") compared to existing LLPs. Similar to the LLP 500 of FIGS. 10-11, the LLP 500 in accordance with these increased HDR embodiments of the present invention may include a projector 508 and a camera 510 and may be connected with an AACMM 100 or similar device. In the alternative, the LLP 500 may be a standalone, hand-held type of device.

An issue for all LLPs 500 is obtaining proper exposure control within each image frame (i.e., each imaged stripe) on relatively high contrast objects (i.e., an object containing both light and dark areas). Similarly, this issue also occurs with the imaging of a scene having both light and dark areas and/or objects within the scene. This is so as to create a relatively accurate image of the object or the scene. In other words, to obtain relatively accurate 3D coordinates with the LLP, it is desirable to accurately image both the light and dark areas of the object, along with the mid-range contrast areas of the object in between, on the photosensitive array of the camera 510.

Typically, in cameras 510, it is difficult to simultaneously obtain good images of dark, mid-range, and light contrast areas of the object or environment. This is due primarily to the limited dynamic range of the imaging device (e.g., a camera 510 such as a CMOS or CCD device having a 2D photosensitive array of light sensing elements—a.k.a., a digital imaging sensor). For example, a CMOS photosensitive array may be used having 2048×1024 light sensing elements and operating at 340 frames ("stripes") per second. The CMOS array generates, for each light sensing element of the array, a digital value that is approximately proportional to the illumination level striking each light sensing element. Most LLPs 500 commercially available today are configured to do a relatively good job in capturing the mid-range contrast areas of an object, but do a relatively poor job in capturing the relatively light and/or dark areas of an object (for "high contrast" objects that have such areas). That is, these LLPs have relatively limited or poor overall dynamic range.

Certain embodiments of the present invention include a system or apparatus for, and a method of, creating a relatively high dynamic range image from multiple different colored exposures of an object that are combined into a single image of the object in each image frame. Other different embodiments disclosed herein retain the object of improving or increasing the dynamic range of the LLP 500.

Figure 12:
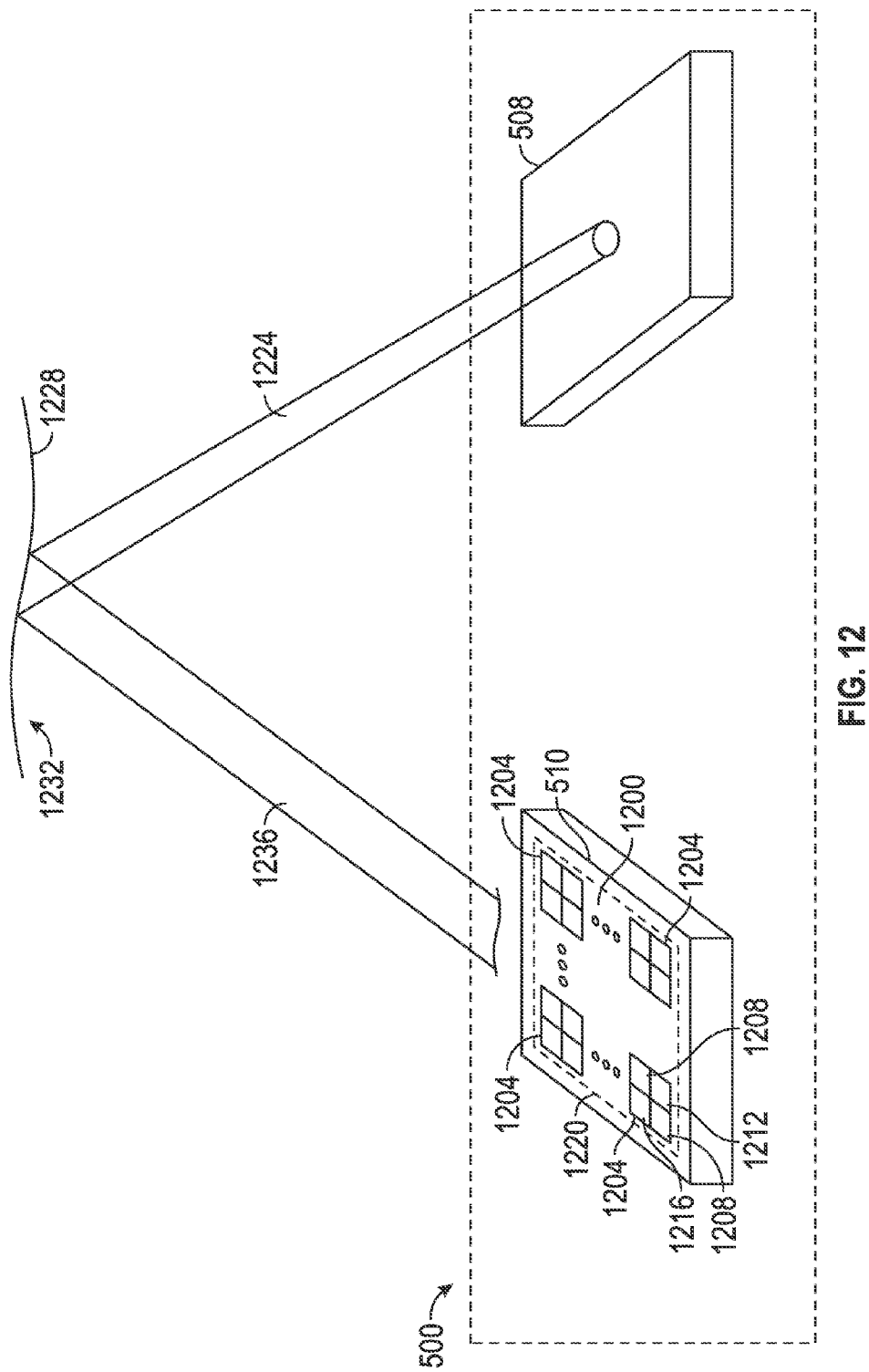
FIG. 12 is a partial perspective view and partial schematic view of an embodiment of the present invention having an array of photodetectors with integrated color filters and a color filter located on top of the array.

Referring to FIG. 12, in embodiments of the present invention, the LLP 500 includes a single color camera 510 that, as mentioned hereinabove, typically comprises a digital imaging sensor which includes a lens or lens system (not shown) and a two-dimensional photosensitive array 1200 (i.e., a square-shaped array 1200 comprising a number of light sensors arranged in rows and columns). The array 1200 comprises a plurality of light sensing elements such as photodetectors (e.g., photodiodes). Most LLPs 500 commercially available today contain a photosensitive array responsive to the overall amount of light received at all wavelengths. Such an array has differing sensitivity to different wavelengths of light, but the response of the camera is based on the integrated effect of all the wavelengths of light. Because such an array does not provide any information about the colors of the incident light, it is referred to as a monochrome array. A photosensitive array that provides separate signals for different colors of light is referred to as a color array, RGB (red, blue, green) array, or RGB image sensor. Thus, one feature of embodiments of the present invention involves the use of a color array 510.

FIG. 12 shows the light sensing elements grouped into a plurality of squares 1204 within the array 1200, each square comprising four light sensing elements. This is done for illustrative purposes to point out the fact that most modern single-chip, solid-state digital imaging sensors include a color filter array ("CFA") formed integral therewith for arranging a mosaic of color filters within the array 1200 of photodetectors.

A common type of CFA utilized is a well-known Bayer filter having one red filter, two green filters, and one blue filters. The two green filtered light sensors 1208 are diametrically opposed from one another, while the blue sensor 1212 and the red sensor 1216 occupy the other two diametrically opposed corners of the square. This square layout of the Bayer CFA is intended to best take advantage of the human visual system's relatively greater ability to discern green detail as opposed to red and blue detail. Each RGB color filter is typically manufactured as an integral part of each square 1204. Hence for a Bayer filter, a square 1204 includes four photodetectors, each photodetector covered by one of a red, green, or blue filter. The squares 1204 are repeated throughout the array 1200. More information about the Bayer CFA is given in U.S. Pat. No. 3,971,065 (the "'065 patent"), which is hereby incorporated by reference herein.

In a color image obtained from a color array, each pixel of the image has associated with it a color, which may in turn be represented by the amount of red, green, and blue light associated with that color. These red, blue, and green colors are obtained from the square 1204, which may therefore also be referred to as pixel 1204, the pixel 1204 being part of the array 1200.

While embodiments of the present invention have been described herein as using a Bayer color filter array, digital imaging sensors may be used having types of CFA's other than a Bayer CFA. Also, the CFA may be formed either integral with the photosensitive array of photodetectors 1204 or alternatively not integral with the array of photodetectors but rather separated from the array (e.g., a glass mosaic of color filters), with the filters located on top of the photosensitive array 1200.

To minimize unwanted effects of background light, for example, from overhead lighting or from sunlight passing through windows, in an embodiment, a filter 1220 having the same color as the projected light source 508 may be placed in front of each CFA of the array 1200. The filter 1220 may comprise a single filter placed in front of the entire array 1200 (as shown in FIG. 12). In the alternative, the filter 1220 may comprise a plurality of individual filters—each being placed in front of a corresponding pixel 1204 in the array 1200. Thus, in embodiments of the present invention the filter or filters 1220 is/are separate from the photosensitive array 1200. However, the filter or filters 1220 may be formed integral within the array 1200, for example, on top of the array 1200 and, thus on top of the CFA.

In an embodiment, a relatively narrow band monochrome blue light source 508 (e.g., a laser, an LED, or a superluminescent diode ("SLD")) is utilized. In other embodiments, a red or green light source is used instead. If a blue light source 508 is utilized, then a blue filter 1220 is placed in front of each photodetector 1204 in the camera sensor array 1200. If a red or a green light source 508 is utilized instead, then a corresponding red or blue filter 1220 is utilized in front of each pixel 1204 in the array 1200.

Following the projection of the blue light 1224 toward the surface 1228 of an object 1232, the light 1236 reflects back from the object 1232 and strikes certain pixels 1204 within the array 1200 simultaneously or near simultaneously. This generates a response from each of the colored filters of the CFA for each frame of the array 1200.

Figure 15:
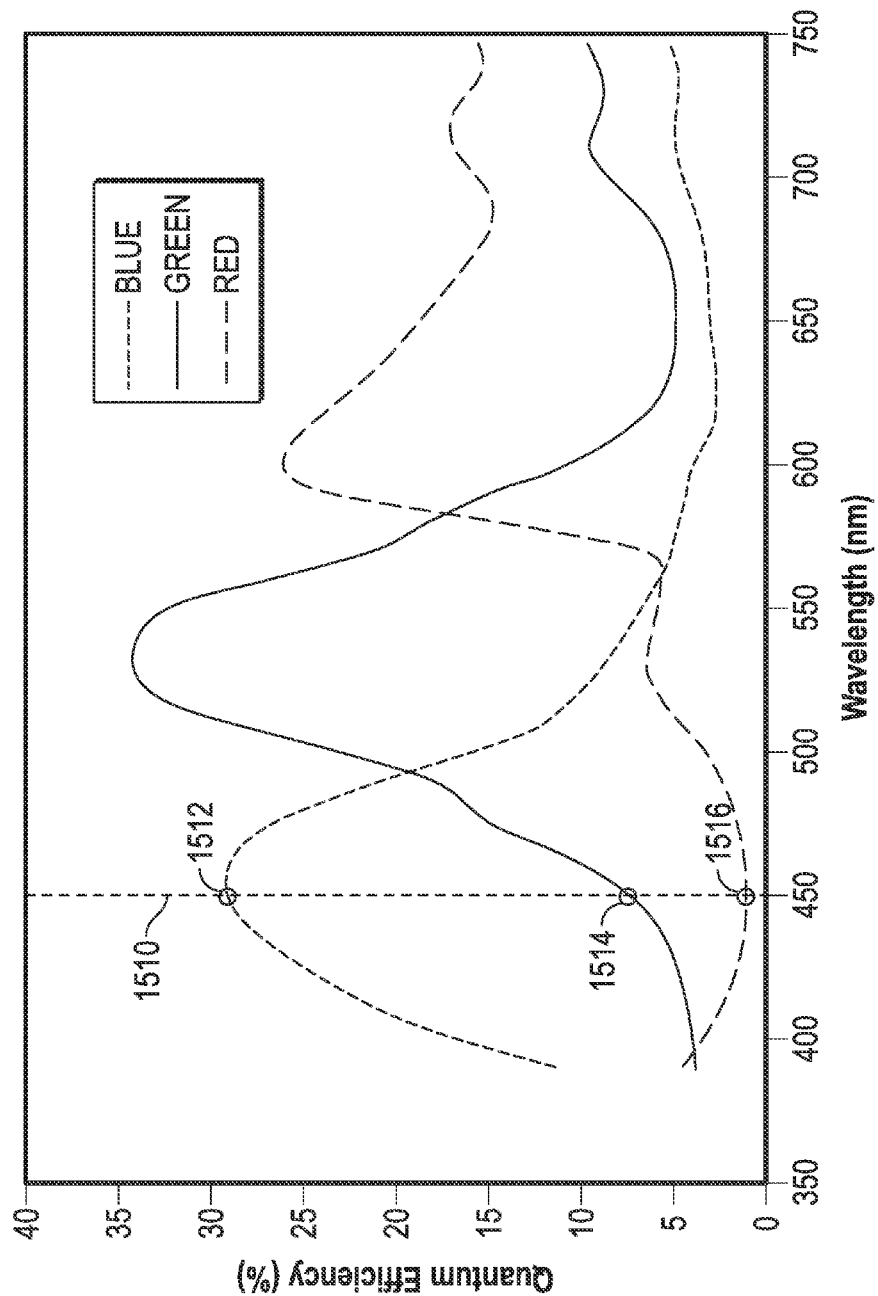
FIG. 15 is a plot of the quantum efficiency of three color filter regions of a photosensitive array.

FIG. 15 shows quantum efficiency for R, G, and B filtered areas of photodetectors (with filter) in a particular CMOS array. The horizontal axis of the graph 1500 indicates wavelength in nanometers, with the spectral colors changing from violet, blue, green, yellow, orange, and red as wavelengths move from 400 nm to 700 nm. The vertical axis indicates the quantum efficiency in percent for each of the red, green, and blue regions. Quantum efficiency is the percentage of photons converted into electrons for each of the regions. In an ideal photodetector, the quantum efficiency would be 100%. All real detectors have somewhat lower quantum efficiency. The graph shows that as expected the blue filter regions has higher quantum efficiency at the blue wavelengths (near 450 nm) than at the green or red wavelengths. Similarly, green and red filtered regions have greater quantum efficiency at the green and red wavelengths, respectively, than at other wavelengths. However, the quantum efficiency is greater than zero for every wavelength in all the filtered regions.

In an embodiment, the light projected from the LLP is blue light having a wavelength of 450 nm, as indicated by the dashed line 1510. At this wavelength, the blue filtered region has a quantum efficiency at 1512 of about 29%. The green filtered region has a quantum efficiency at 1514 of about 8%. The red filtered region has a quantum efficiency at 1516 of about 2%.

Consider now the three cases of differing surface reflectance: (1) a surface portion having a high reflectance, (2) a surface portion having a low reflectance, and (3) a surface portion having an intermediate level of reflectance. For the portion of the surface 1228 having a low reflectance, the amount of light received at the photosensitive array 1200 will be relatively weak. In this case, the signal from the blue detector will be most important since it gives the largest response. On the other hand, for the portion of the surface 1228 having a high reflectance, the amount of light received at the photosensitive array 1200 will be relatively large, possibly large enough to saturate the photodetectors of the blue and green filtered regions. In this case, the signal from the red detector will be most important since it is least likely to saturate. For the case in which the surface portion has an intermediate level of reflectance, signals from all three detectors may be important. To obtain the highest quality measurement, it is desirable that the ratio of signal to noise from some combination of signals from the R, G, and B regions be maximized subject to the constraint that the signals are taken only from those photodetectors operating within their linear regions.

Each photodetector produces an electrical signal in response to the incident light. Within the linear region of a photodetector, the quantum efficiency is a constant. So, for example, a photodetector might have a quantum efficiency of 0.3 (or 30%). This indicates that the probability is 0.3 that an incident photon will generate an electron subsequently provided in a signal to image processing electronics. However, as photons are converted into electrons and an electron well gets full, the probability of obtaining an electron from an incident photon decreases. In an extreme case, the electron well may overflow. In some types of arrays, the overflowing electrons may cause blooming by flowing onto adjacent pixels. In measurements involving an LLP, a certain amount of non-linearity can be tolerated. The amount of non-linearity that can be allowed needs to be determined on a case-by-case basis, according to the technology and signal processing requirements. However, with this in mind, it can be stated that generally it is desirable to operate each of the photodetectors within their linear regions.

An object 1228 may have a variety of different colors over its surface, with each of the different surface colors reflecting different amounts of the projected light 1224. The human eye is not very good at predicting how much projected light 1224 will be reflected by a surface portion having an apparent color. For example, a portion of the surface 1228 may appear red to the eye and as expected reflect relatively little blue light. However, another surface region that appears the same color to the eye may reflect a relatively larger amount of blue light.

A formula is used to weight the various amounts of light. Weighting factors $w_R$, $w_G$ and $w_B$ for a CFA having red, green, and blue filter regions, respectively, satisfy the condition $w_R+w_G+w_B=1$. Let the corresponding quantum efficiencies be $\eta_R$, $\eta_G$ and $\eta_B$, and the corresponding number of photons entering the array 1200 from the reflected light 1236 be $N_P$. If the photodetectors of all the RGB regions are operating in their linear regions and if the CFA is a Bayer filter, then the effective (weighted) number of electrons $N_E$ received by a pixel 1204 of the photosensitive array 1200 is $$N_E = N_P(w_R\eta_R + 2w_G\eta_G + w_B\eta_B). \quad \text{(Eq. 1)}$$

The weighting factors are selected to maximize the signal-to-noise ratio while avoiding nonlinear effects such as saturation. For cases in which nonlinearity is a problem, some of the weighting factors may be set to zero. Weighting factors may be a function of the overall amount of light passing through the filter 1220 onto the pixels 1204.

An important aspect of the method described herein is that by selecting the weighting factors appropriately, greater dynamic range than that ordinarily available from the camera system. As explained hereinabove, one cause of limited dynamic range is the limited range of ADCs, which may provide only 8 bits (about 48 dB dynamic range) or 10 bits (about 60 dB dynamic range). In many cases, the most important factor limiting the dynamic range of a photosensitive array is not the ADC used with the array but rather the linear range of the photosensitive array itself—in other words the ratio of the largest optical signal that can be faithfully captured to the smallest optical signal that can be faithfully captured. Other factors besides the number of bits of the ADC and the intrinsic linear range of the photodetectors can further degrade the dynamic range of the image obtained from a camera system. When using the method described herein, it is usually desirable to increase the optical power level of the projected light 1224 or, equivalently, to increase the exposure time for each camera frame. This will result in some of the filter regions being overexposed. For the discussed in reference to FIG. 15, the blue filter region may be overexposed in this case. However, the filter regions for green and red have much lower quantum efficiency and hence are very unlikely to be overexposed. Conversely, by providing a relatively high projected light level or relatively long exposure, portions of the surface sending relatively small amounts of light onto the array 1200 may still be sensitively detected with the most sensitive filter region. In the example discussed in reference to FIG. 15, the blue filter region would provide the most sensitive response. By selecting appropriate weighting factors for the CFA of each pixel 1204, the effective dynamic range may be greatly increased beyond that otherwise available. For example, it might be possible to increase dynamic range to 100 dB or more even using a camera having an ADC of only 10 bits (about 60 dB).

Alternative methods for weighting colors for each pixel are described hereinbelow. However, whatever method is used, the objective is to obtain for each pixel an "effective illumination level" for each pixel. The optical power incident on a pixel for each color is converted by the photodiode of each color filter region into an electrical signal level. This signal level is converted into a digital level, which is combined by a processor to obtain an effective illumination level. In an embodiment, Eq. (1) is used to obtain an effective illumination level for each pixel. In other embodiments, alternative mathematical methods are used to obtain an effective illumination level for each pixel. An important characteristic of the effective illumination level compared to the illumination level obtained from a monochrome camera is that in many cases the effective illumination level provides greater dynamic range, thereby enabling more accurate 3D coordinate measurements to be made. In particular, it enables materials that are dark, shiny, transparent, or steeply inclined to be measured while, at the same time, providing the ability to measure materials having relatively high reflectance.

Figure 13:
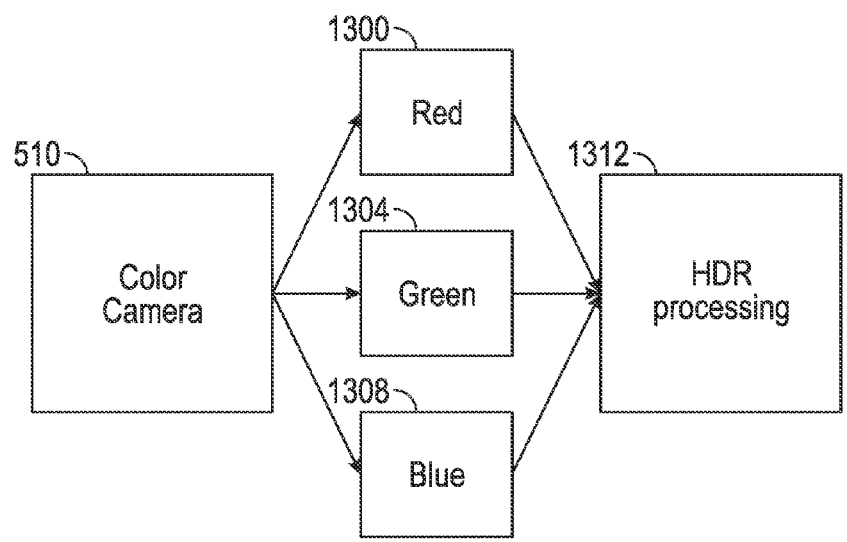
FIG. 13 is a block diagram showing a portion of an embodiment in which the red, green and blue images of an object from a color camera are processed to provide an overall image of the object with increased high dynamic range.

Referring to FIG. 13, in certain embodiments of the present invention, each of the blue, red and green image pixel data from the color camera 510 is separated from the overall single image for each frame or stripe provided by the camera 510 and treated as three separate images 1300, 1304, 1308 (i.e., red, green and blue images) for each image frame. These three separate images 1300, 1304, 1308 are then processed by a high dynamic range algorithm 1312 (an "HDR Processing" function 1312) that is part of embodiments of the present invention. The algorithm may comprise software executable steps or instructions that are carried out by a processor (e.g., the controller 512 within the LLP 500) that comprises the HDR processing function 1312. The processor may comprise, for example, a digital signal processor ("DSP") or field programmable gate array ("FPGA"). The algorithm 1312, embodiments of which are described in detail hereinafter, combines or "fuses" the three separate color images 1300, 1304, 1308 into a single image that is properly exposed in both the relatively light and dark areas, thereby accurately recreating an image of the object 1232.

Once the single image is generated, well-known triangulation techniques may be used to determine the three-dimensional coordinates of each point within the single image, from which the overall image of the object is created. In an LLP, the line of light emitted from the projector 508 is typically oriented perpendicular to a plane containing the optical axes of the projector 508 and the camera 510. For a flat surface located a constant distance from the LLP, the line of light is straight and appears in the same direction in an image of the camera 510. If the flat surface is kept a constant distance from the LLP but moved farther away from the LLP, the line remains straight but shifts to the side. By noting the shape of the line, which is not necessarily straight, the 3D coordinates of points on the surface 1228 may be determined. A line between perspective centers of the projector 508 and the camera 510 is referred to as a baseline, and the length of the baseline is the baseline distance. In general, the calculation used to determine these coordinates is based on the baseline distance, the orientations of the projector 508 and camera 510 relative to the baseline, and on the image obtained by the photosensitive array of the camera 510. The image of the camera is converted by electronics into a digital signal, which is evaluated by a processor to determine the 3D coordinates of the surface points. Because methods of triangulation with LLPs are well known in the art, these methods are not discussed further.

In embodiments of the present invention, a projector 508 may produce monochromatic (e.g., blue) light and a color camera 510 may capture the image of the projected line or stripe of light 1224 after it is reflected off the surface 1228 of the object 1232. An image of the projected line or stripe pattern is captured by the color camera 510 in a single exposure or frame for each frame or stripe and stored as three values per image pixel (i.e., RGB). The three values are the intensities for the red, green and blue color channels captured by the respective color image light sensors 1208, 1212, 1216 in the array 1200. The color image is then separated into three separate, new monochrome images 1300, 1304, 1308 containing the intensities for each color channel. The result is a a blue channel image 1308 that is usually overexposed with large areas of saturation. Also produced are a green channel image 1304 that tends to be correctly exposed and a red channel image 1300 that is underexposed. The blue channel image 1308 gives a relatively good exposure on dark object surfaces 1228 and the green channel image 1304 gives a relatively good exposure on brighter object surfaces 1228. The intensities recorded in the red channel image 1300 do not generally give a good exposure on any object surface 1228 because the intensity values are relatively low but the high dynamic range images are better when the red channel image 1300 is included.

Figure 14:
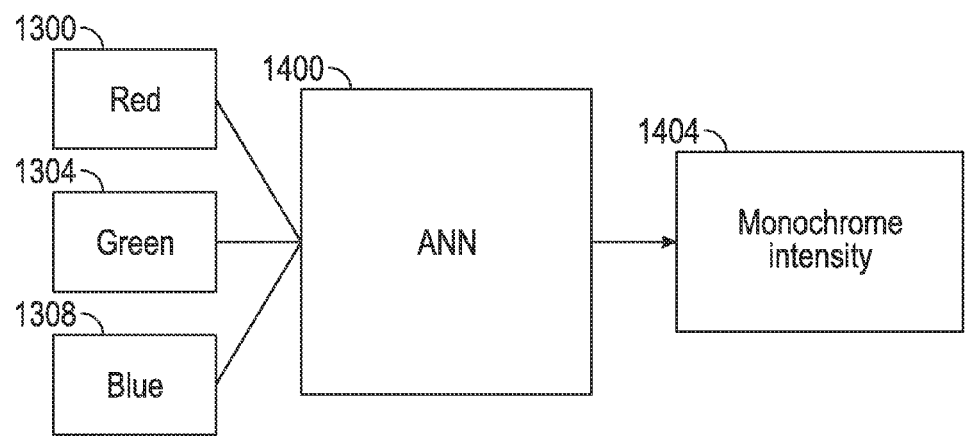
FIG. 14 is a block diagram showing that the processing in FIG. 13 is performed using an artificial neural network.

The three monochrome intensity images 1300, 1304, 1308 from the three color channels are then combined or fused together using an algorithm or method to produce the single high dynamic range image. There are many ways to carry out this combination or fusion operation using a high dynamic range algorithm or some other method of combination—either software-based or hardware-based or a combination of both. For example, referring to FIG. 14, an artificial neural network ("ANN") 1400 may be used to carry out the high dynamic range processing 1312. An ANN 1400 works by processing a set of inputs to produce one or more outputs. ANNs are commonly used for classification and pattern matching, but an ANN 1400 may be used in embodiments of the present invention for combining the three color image intensities 1300, 1304, 1308 into a single monochrome intensity image 1404 in the single high dynamic range image per frame. The inputs to the ANN are the three color channel image intensities 1300, 1304, 1308 and the output is the single monochrome intensity value 1404. This is processed on a per pixel basis within the image so that the pixel intensity at location (0,0) in the high dynamic range image 1404 is calculated from the intensities at location (0,0) in the individual color channel images 1300, 1304, 1308.

The ANN 1400 typically must be trained before it can be used to calculate the HDR values in the output image 1404. This is commonly carried out using training data. In an embodiment, the three monochrome intensity images 1300, 1304, 1308 may be combined using commercially available HDR software to produce an HDR image 1404 that provides a relatively even exposure on both dark and light surfaces. This output image 1404 can then be used to train the ANN 1400 to find a function that may process each input set of images 1300, 1304, 1308 to equal the software produced HDR output image 1404. After this training stage is complete, the ANN 1400 can then be used with new values for the three monochrome intensity images 1300, 1304, 1308 and the ANN 1400 will predict the HDR output image 1404 from the three color channel images 1300, 1304, 1308.

In an embodiment of the present invention, the type of ANN 1400 used in the HDR algorithm may be a multi-layer, perceptron-type ANN. This type of ANN is typically used for pattern recognition or classification. The HDR algorithm is essentially a function approximation system that blends a certain set of inputs to a particular output depending on the data that the ANN 1400 was trained with. A perceptron ANN takes a set of one or more inputs and creates a mapping to a set of one or more outputs. Typically, a perceptron ANN contains three or more layers: an input layer, one or more hidden layers, and an output layer. However, ANNs can have just two layers, an input layer and an output layer, but two layer perceptron ANNs are usually unable to solve XOR problems and, as such, are typically only useful in very basic tasks.

In the perceptron ANN each layer usually contains one or more neurons (or nodes) which are connected to all other nodes in the neighboring layers by a weight value. "Neighboring" typically means that the input layer has no direct connection to the output layer, but the hidden layer is connected to both the input and the output layers.

The value at a node is usually calculated as a weighted combination of the nodes in the layers previous to the node. This means that the hidden nodes (e.g., $H_1$, $H_2$) are calculated using the input layer nodes (e.g., $I_1$, $I_2$, $I_3$) and weights (e.g., $w_1$-$w_8$), while the output layer node value ($O_1$) is calculated using the hidden node values and weights. This may be given by the following equations:

$$H_1 = I_1 w_1 + I_2 w_3 + I_3 w_5 \quad \text{(Eq. 2)}$$

$$H_2 = I_1 w_2 + I_2 w_4 + I_3 w_6 \quad \text{(Eq. 3)}$$

$$O_1 = H_1 w_7 + H_2 w_8 \quad \text{(Eq. 4)}$$

In a multilayer perceptron ANN the node values themselves are not used. Instead, the result of passing the weighted combination through a particular function is used. The function is non-linear and is designed to model the biological neurons in the brain. The most common function used is the hyperbolic tangent function (tan h) and this may be used in the ANN 1400 of the HDR algorithm in embodiments of the present invention. This modifies the previous three equations to:

$$H_1 = f(I_1 w_1 + I_2 w_3 + I_3 w_5) \quad \text{(Eq. 5)}$$

$$H_2 = f(I_1 w_2 + I_2 w_4 + I_3 w_6) \quad \text{(Eq. 6)}$$

$$O_1 = f(H_1 w_7 + H_2 w_8) \quad \text{(Eq. 7)}$$

Where $f(x) = \tan h(x)$

If the output layer nodes pass through the function then the output will be a binary classifier. However, in an embodiment, the output layer does not pass through the function because an output value between 0 and 255 possible pixel intensity values is needed, which would not be possible otherwise.

The weightings on the connections must be calculated before the ANN is of any use. In a perceptron ANN this is typically carried out as a training or "supervised learning" task, which means that the inputs and outputs of the ANN 1400 are known and the weights are discovered using this knowledge.

The ANN described so far illustrates the approximate configuration of the ANN 1400 used in the HDR algorithm. The hidden layer may actually contain more nodes than described. For training purposes, there are three input nodes to the ANN 1400 which may be referred to as R, G and B. These inputs correspond to the three color channel images 1300, 1304, 1308 extracted from the single color camera image. Each input node is a value between 0-255 which is the value range of an eight bit pixel. The output node value is also in the range 0-255 because it is also an eight bit pixel value.

The training of the ANN 1400 may be performed using several sets of input images and their corresponding HDR output images created using commercial HDR software. This means that for a particular output node value the input node values are known. By applying a technique called backpropagation, the weights on the node connections are calculated to minimize the difference between the actual output image and the estimated image created by the ANN 1400. Typically there are two data sets used for training. One dataset is used for calculating the weightings and another set is used to validate the weightings by calculating the output and comparing the estimate to the actual output. This is done to ensure than the ANN 1400 has not over fit to the training data which would mean that it was unusable for any other datasets.

In an embodiment of the present invention, the HDR algorithm is implemented as a parallel algorithm where many image pixels are processed at the same time. It is possible to also carry out the processing sequentially, but the time required for this will be relatively much higher.

In other embodiments of the present invention, a combination or fusion method other than one involving use of an artificial neural network 1400 may be used to combine or fuse together the separate images 1300, 1304, 1308 into a single composite image 1404. For example, a fusion function may keep updating each image pixel of the single composite image if an image pixel is not saturated in its current exposure. A saturation condition may be defined, for example, as if an image pixel's intensity values never exceeded a pre-defined threshold in all phase shifting images. As such, the particular image pixel is considered not saturated in this exposure setting. The term "fusion" in this instance is used with regard to how the information obtained from the separate RGB images 1300, 1304, 1308 is combined (fused) into a single 3D image coordinate. That is, each of the RGB elements is at nearly the same place on the photosensitive array 1200. Thus, the three values are fused into a single 3D value, rather than calculating 3D coordinate values for each. This may be carried out using a weighting algorithm in which those 3D values for which the voltage levels are in the desirable range are given different weightings than the weightings for the 3D values for which the voltage levels are too high or too low. Another possible fusion method may be based on normalization.

In other embodiments of the present invention, instead of using three separate images (i.e., red, blue and green) 1300, 1304, 1308, each pixel 1204 of the array 1200 may be analyzed (e.g., compared to one another) and the one of the red, green and blue light sensors of the pixel 1204 of the photosensitive array 1200 having a certain type of appropriate responsivity to the projected blue monochrome light may be selected, for example, to give a well level nearest the full well capacity without being saturated.

In an alternative embodiment of the present invention, instead of using a single color camera 510 as part of the LLP 500, the LLP 500 may incorporate three color cameras 510. A first camera 510 may be utilized to respond to red light, a second camera 510 may utilized to respond to blue light, and a third camera 510 may be used to respond to green light. The desired response from each camera 510 may be achieved by using an appropriate color filter 1220 located in front of the photosensitive array 1200 in each camera 510. As in the single camera embodiments disclosed hereinabove, the response of each of the three cameras 510 is compared to one another to select those levels that are optimal, or the response values may be fused using methods described above. 3D values are obtained from each of the image points, and these may be integrated into a single 3D image. Whichever method is used, the response curves for R, G, and B should produce attenuations that are in reasonable relative ratios, for example 1:2:4.

For the embodiments having three separate cameras 510 (or two cameras, four cameras, etc.), with each camera 510 having different color filters 1220 (i.e., RGB) to respond differently to RGB (or similar wavelengths), a separate triangulation calculation must be carried out for each camera 510, and 3D coordinates will be obtained for each image pixel that correspond to each of the cameras 510.

Also, since each of the cameras 510 will have a different field of view, each will cover a slightly different region of the surface 1228 of the object 1232 being scanned, and the region covered will vary somewhat according to the distance of the LLP 500 scanner from the object 1232 and the angle of the LLP 500 with respect to the object 1232. In this instance, one does not necessarily want a one-to-one correspondence between light sensors 1204 on the three different photosensitive arrays 1200 since these corresponding light sensors 1204 would not necessarily correspond to the same region in space.

Instead, consider the embodiment in which, firstly, consider the entire set of image pixels from all three cameras 510 and the corresponding derived 3D coordinates for the three cameras 510. For each of the image pixels, keep the calculated 3D value if the number of electrons within each photodetector well is in the desired range—not too few pixels and not too many. In practice, the number of electrons will be determined by a voltage measured by the ADC in the digital imaging sensor. For the case of a CMOS sensor array, the ADC will be integrated into the sensor itself. For the case of a CCD array, the ADC will be external component placed outside the CCD. In either case, the processor (e.g., the controller 512) will know whether each well voltage is within an acceptable range—neither too high (saturated or nearly saturated) nor too low (in the noisy region).

In an embodiment, the processor 512 may further consider the distance between nearest image pixel neighbors in determining whether to discard 3D values. For example, if two image pixels are relatively very close to one another in 3D space and one of the image pixels has a very low voltage (i.e., in the noisy region), while the other one of the image pixels has a nearly optimum voltage, it may be that the 3D value for the pixel having the low voltage is discarded. There is also the possibility of interpolating image pixel values in angle space (or the corresponding transverse distance space) to obtain a more uniform pattern of 3D coordinates. This approach produces relatively clean looking meshed patterns ("meshed" patterns being a collection of triangles drawn between the 3D points).

Instead of using three color cameras 510, three monochrome cameras may be used instead, in alternative embodiments. Appropriate color filters (i.e., red, green and blue) would be located in front of the photosensitive array 1200 in each camera—that is, a red filter in front of a first camera 510, a blue filter in front of a second camera 510, and a green filter in front of a third camera 510. Similar to the color camera embodiments described hereinabove, the response of each camera 510 may be compared to select the relatively best well levels. Alternatively, the response values from the three cameras 510 may be combined or fused together using the ANN algorithm described hereinabove or through use of some other method.

In other embodiments of the present invention for increasing the high dynamic range of an LLP 500, the speed of data collection by the LLP 500 may be adjusted according to the speed of movement of the LLP 500. This embodiment may also be used for other types of line scanners, or even area scanners which emit a two-dimensional pattern of light over an area.

It may be desirable to provide the user of an LLP 500 with a uniform (or nearly uniform) grid or lines of points (in angle or transverse coordinate), each point in the grid or on a line corresponding to different distance and 3D coordinate values. If the LLP 500 is moved relatively slowly by the user (either the LLP 500 being attached to an AACMM 100 or being hand-held), more data is collected than is required to obtain such a grid or lines of points. On the other hand, if the LLP 500 is moved relatively quickly, less data may be collected than is desired.

A way to collect a relatively uniform grid or lines of 3D points is to adjust the rate at which data is collected according to the speed of the LLP 500. For the case of an LLP 500 attached to an AACMM 100, the speed of the LLP 500 may be determined based on encoder readings within the AACMM 100, since these are sufficient to determine the six degrees of freedom of the LLP 500 attached to the probe end of the AACMM 100. The times at which data are collected may be determined based on any of the various methods—for example, triggering (interrupts) or polling. For the case in which the LLP 500 is moved relatively too quickly to permit a grid or lines having the desired spacing, a light may be illuminated on the LLP 500, or another warning indicator given, to indicate to the user that the LLP 500 should be moved relatively more slowly.

These embodiments of varying the speed at which data is collected from the LLP 500 may be independent of the prior embodiments of the present invention described hereinabove. In the alternative, the embodiments of varying the speed at which data is collected from the LLP 500 may be used with any of the other embodiments described hereinabove for increasing the HDR of an LLP 500.

Additional embodiments of the present invention involve the use of an integrated circuit or chip that includes a built-in bilateral filter. Bilateral filtering methods reduce noise in smooth regions while retaining sharp edges. This type of filtering method is commonly used in post-processing data, but in this case the capability is included within the chip itself.

A second aspect of this chip is that it includes the features of merging multiple images into a single high dynamic range image using camera processing. The chip performs the required processing in a few hundred milliseconds, rather than in a few seconds as in current cameras. One method for improving the dynamic range of laser line scanners or LLPs 500 is to change the projected optical power sequentially and then select the pixels having the optimum number of electrons in each pixel well. A method for varying the exposure is also an approach for obtaining increased high dynamic range. The simplest way to vary exposure is to vary the exposure time of the camera. This variation in exposure time may be performed sequentially, as in the embodiment in which optical power levels are varied. It may, in some cases, be possible to perform the HDR calculation in a chip, but in most cases this will probably not be possible since in the general case each exposure corresponds to a different position of the LLP 500.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for measuring three-dimensional (3D) coordinates of points on a surface of an object, the method comprising:
   providing a 3D coordinate measurement device, the device including a manually positionable articulated arm portion, an electrical circuit having a processor, and a laser line probe, the arm portion having opposed first and second ends, the second end coupled to a base, the arm portion including a plurality of connected arm segments, each of the arm segments including at least one position transducer configured to produce a position signal, the laser line probe coupled to the first end, the laser line probe including a projector and a camera, the projector separated from the camera by a baseline, the baseline being a line segment, the projector configured to project a line of light having a first color onto the surface, the camera including a lens and a photosensitive array, the lens configured to form an image on the photosensitive array of the line of light projected onto the object and reflected by the surface, the photosensitive array having a plurality of pixels, each pixel having a first monochromatic photodetector, a second monochromatic photodetector responsive to a different color than the first monochromatic photodetector, and a third monochromatic photodetector responsive to a different color than the first and the second monochromatic photodetectors, the first monochromatic photodetector configured to provide a first electrical signal level, the second monochromatic photodetector configured to provide a second electrical signal level, and the third monochromatic photodetector configured to provide a third electrical signal level, the first, second and third electrical signal levels provided in response to an optical power incident on the respective pixel, the first electrical signal level representative of a first intensity of light captured by the first monochromatic photodetector, the second electrical signal level representative of a second intensity of light captured by the second monochromatic photodetector, and the third electrical signal level representative of a third intensity of light captured by the third monochromatic photodetector;
   projecting the line of light onto the surface;
   forming an image of the line of light reflected by the surface on the photosensitive array and sending the first, second and third electrical signal levels to the processor in response;
   applying via the processor first, second and third weighting factors to each respective quantum efficiency associated with each of the first, second and third monochromatic photodetectors;
   determining with the processor an effective illumination level for each pixel, the effective illumination level for each pixel based at least in part on the first, second and third electrical signal levels and the applied first, second and third weighting factors; and
   determining with the processor the 3D coordinates of points on the surface, the 3D coordinates based at least in part on a length of the baseline, an orientation of the projector to the baseline, an orientation of the camera to the baseline, the effective illumination level for each pixel, and the position signals.

2. The method of claim 1, further comprising:
   via the processor, separating image pixel data associated with each of the first, second and third monochromatic photodetectors into first, second and third images, and separately processing each of the first, second and third images to provide three separate images having different degrees of exposure;
   via the processor, combing the three separate images to obtain a single high dynamic range image;
   wherein the step of determining with the processor the 3D coordinates, the determining is further based on the single high dynamic range image.

3. A laser line probe, comprising:
   a projector, a camera, and an electrical circuit, the projector separated from the camera by a baseline, the baseline being a line segment, the projector configured to project a line of light having a first color onto a surface, the camera including a lens and a photosensitive array, the lens configured to form an image on the photosensitive array of the line of light projected onto the object and reflected by the surface, the photosensitive array having a plurality of pixels, each pixel having a first monochromatic photodetector, a second monochromatic photodetector responsive to a different color than the first monochromatic photodetector, and a third monochromatic photodetector responsive to a different color than the first and the second monochromatic photodetectors, the first monochromatic photodetector configured to provide a first electrical signal level, the second monochromatic photodetector configured to provide a second electrical signal level, and the third monochromatic photodetector configured to provide a third electrical signal level, the first, second and third electrical signal levels provided in response to an optical power incident on the respective pixel, the first electrical signal level representative of a first intensity of light captured by the first monochromatic photodetector, the second electrical signal level representative of a second intensity of light captured by the second monochromatic photodetector, and the third electrical signal level representative of a third intensity of light captured by the third monochromatic photodetector, the electrical circuit including a processor responsive to executable instructions which when executed by the processor is configured to:

receive the first, second and third electrical signal levels in response to an image of the line of light reflected from the surface having been formed on the photosensitive array;

apply first, second and third weighting factors to each respective quantum efficiency associated with each of the first, second and third monochromatic photodetectors;

determine an effective illumination level for each pixel, the effective illumination level for each pixel based at least in part on the first, second and third electrical signal levels and the applied first, second and third weighting factors; and determine 3D coordinates of points on the surface, the 3D coordinates based at least in part on a length of the baseline, an orientation of the projector to the baseline, an orientation of the camera to the baseline, and the effective illumination level for each pixel.

4. The laser line probe of claim 3, further comprising a handle enclosing electronic components.

5. The laser line probe of claim 3, further comprising a probe tip.

6. The laser line probe of claim 3, wherein the photosensitive array is a color charge-coupled device.

7. The laser line probe of claim 3, further comprising a mechanical coupler configured to attach the laser line probe to a host device.

8. The laser line probe of claim 7, wherein the host device is an articulated arm coordinate measurement machine.

* * * * *